United States Patent
Ryan et al.

(10) Patent No.: US 7,213,766 B2
(45) Date of Patent: May 8, 2007

(54) MULTI-INTERFACE COMPACT PERSONAL TOKEN APPARATUS AND METHODS OF USE

(75) Inventors: Dennis J. Ryan, Chandler, AZ (US); David Finn, Mayo (IE); Patrick R. Comiskey, University Heights, OH (US); Norbert Knapich, Rosshaupten (DE)

(73) Assignee: DPD Patent Trust Ltd, Lower Churchfield, Tourmakeady Co. Mayo (IE)

( * ) Notice: Subject to any disclaimer, the term of this patent is extended or adjusted under 35 U.S.C. 154(b) by 0 days.

(21) Appl. No.: 10/990,296

(22) Filed: Nov. 16, 2004

(65) Prior Publication Data

US 2005/0109841 A1 May 26, 2005

Related U.S. Application Data

(60) Provisional application No. 60/520,698, filed on Nov. 17, 2003, provisional application No. 60/562,204, filed on Apr. 14, 2004, provisional application No. 60/602,595, filed on Aug. 18, 2004.

(51) Int. Cl.
*G06K 19/06* (2006.01)
(52) U.S. Cl. .................... 235/492; 235/472.02
(58) Field of Classification Search ........... 235/380, 235/375, 492; 705/41, 44; 713/172, 200, 713/201
See application file for complete search history.

(56) References Cited

U.S. PATENT DOCUMENTS 3,941,489 A 3/1976 Bryan
4,367,965 A 1/1983 Speitel et al.
5,761,648 A 6/1998 Golden et al.
6,067,235 A 5/2000 Finn et al.
6,085,320 A 7/2000 Kaliski, Jr.
6,148,354 A 11/2000 Ban et al.
6,168,077 B1 * 1/2001 Gray et al. ................ 235/375
6,189,098 B1 2/2001 Kaliski, Jr.

(Continued)

FOREIGN PATENT DOCUMENTS

DE 19631050 2/1998

(Continued)

OTHER PUBLICATIONS

*ACR38CT Contactless SIM Tracker Technical Specification*, Advanced Card Systems Ltd., Hong Kong, no date.

(Continued)

*Primary Examiner*—Uyen-Chau N. Le
(74) *Attorney, Agent, or Firm*—Gerald E. Linden; Dwight A. Stauffer

(57) ABSTRACT

A compact personal token apparatus (100,120,140,200,220, 300,320,500), resembling a conventional USB memory fob in size, shape, and form which can be plugged into a PC and interfaced with the virtual world of the Internet. The apparatus is capable of loading and storing information from the Internet, via the PC to its flash memory (410) or EEPROM and then using the stored information or value via its contactless interface (108,128,148,508) in the real world. The apparatus is capable of implementing an auto-run application, when inserted into a personal computer. The apparatus is capable of exchanging information with other devices having compatible interfaces. The apparatus can also function as a firewall (400) when plugged between an Internet connection and a PC.

57 Claims, 4 Drawing Sheets

U.S. PATENT DOCUMENTS

| | | | |
|---|---|---|---|
| 6,240,184 B1 | 5/2001 | Huynh et al. | |
| 6,283,658 B1 | 9/2001 | Estevez et al. | |
| 6,370,603 B1* | 4/2002 | Silverman et al. | 710/72 |
| 6,385,677 B1* | 5/2002 | Yao | 711/115 |
| 6,505,773 B1 | 1/2003 | Palmer et al. | |
| 6,543,690 B2* | 4/2003 | Leydier et al. | 235/451 |
| 6,567,273 B1* | 5/2003 | Liu et al. | 361/737 |
| 6,658,516 B2* | 12/2003 | Yao | 710/301 |
| 6,676,420 B1* | 1/2004 | Liu et al. | 439/131 |
| 6,694,399 B1* | 2/2004 | Leydier et al. | 235/492 |
| 6,724,680 B1 | 4/2004 | Ng et al. | |
| 6,748,541 B1* | 6/2004 | Margalit et al. | 713/201 |
| 6,752,321 B1* | 6/2004 | Leaming | 235/492 |
| 6,763,399 B2* | 7/2004 | Margalit et al. | 710/13 |
| 6,772,956 B1* | 8/2004 | Leaming | 235/492 |
| 6,798,169 B2 | 9/2004 | Stratmann et al. | |
| 6,801,956 B2* | 10/2004 | Feuser et al. | 235/492 |
| 6,848,045 B2* | 1/2005 | Long et al. | 713/200 |
| 6,876,420 B2 | 4/2005 | Hong et al. | |
| 6,879,597 B2* | 4/2005 | Tordera et al. | 370/463 |
| 6,983,888 B2* | 1/2006 | Weng | 235/492 |
| 2001/0043702 A1* | 11/2001 | Elteto et al. | 380/278 |
| 2001/0054148 A1* | 12/2001 | Hoornaert et al. | 713/172 |
| 2002/0011516 A1 | 1/2002 | Lee | |
| 2003/0000267 A1 | 1/2003 | Jacob et al. | |
| 2003/0028797 A1 | 2/2003 | Long et al. | |
| 2003/0087601 A1 | 5/2003 | Agam et al. | |
| 2003/0102380 A1 | 6/2003 | Spencer | |
| 2003/0236821 A1* | 12/2003 | Jiau | 709/203 |

FOREIGN PATENT DOCUMENTS

| | | |
|---|---|---|
| HK | 1063994 | 12/2004 |
| HK | 1063995 | 12/2004 |
| JP | 2004246720 | 9/2004 |
| JP | 2004246720 A * | 9/2004 |
| WO | WO99 038062 | 7/1999 |
| WO | WO99 052051 | 10/1999 |
| WO | WO00 036252 | 6/2000 |
| WO | WO00 042491 | 7/2000 |
| WO | WO00 065180 | 11/2000 |
| WO | WO00 075755 | 12/2000 |
| WO | WO01 014179 | 3/2001 |
| WO | WO01 038673 | 3/2001 |
| WO | WO01 048339 | 7/2001 |
| WO | WO01 048342 | 7/2001 |
| WO | WO01 061692 | 8/2001 |
| WO | WO01 039102 | 11/2001 |
| WO | WO01 088693 | 11/2001 |
| WO | WO01 096990 | 12/2001 |
| WO | WO 200196990 A2 * | 12/2001 |
| WO | WO03 014887 | 2/2003 |
| WO | WO03 034189 | 4/2003 |
| WO | WO04 002058 | 12/2003 |
| WO | WO04 081706 | 9/2004 |
| WO | WO04 081769 | 9/2004 |

OTHER PUBLICATIONS

*ACR38DT Dual Key Technical Specifications, Version 1.3*, Sep. 2004, Advanced Card Systems Ltd., Hong Kong.

*Dallas Semiconductor DS1490F 2-in-1 Fob*, Dallas Semiconductor, Dallas TX, no date.

*Dallas Semiconductor DS9490R-DS9490B USB to 1-Wire/iButton Adaptor*, Maxim I-C, Sunnyvale CA, no date.

Hara, Yoshiko, *Matsushita blends FERAM technology with smart cards*, EE Times, Oct. 1, 2004, CMP Media, Manhasset NY.

*Japan's Matsushita developing memory cards with smart chip function*, Oct. 1, 2004, Mercury News, San Jose CA.

*OTi-6828 Flash Disk Controller*, Ours Technology Inc., Taiwan, no date.

*Panasonic Develops RFID smartSD Card*, Oct. 4, 2004, Palminfocenter.com, Sunnyvale CA.

*Panasonic Develops Industry's First SD Memory Card with Contacless Smart Card Capabilities*, Oct. 1, 2004, The Japan Corporate News Network, Tokyo.

Rojas, Peter, *Panasonic's Smart SD adds RFID to the mix*, Oct. 4, 2004, Engadget LLC, New York NY.

*Delivering ultimate security, high performance and ultra low power consumption, SmartMX is now in volume supply*, Nov. 18-20, 2003, Cartes 2003, aris Nort Villepinte, France.

Balaban, Dan, *Digital Rights pits SIMS against Flash Cards, Card Technology*, Nov. 2004, pp. 24, 25, 26, 28, 30, Card Technology, Chicago IL.

*Smart MX P5CT072 Secure Dual Interface PKI Smart Card Controller, Rev. 1.3*, October 2004, Koninklijke Philips Electronics NV, The Netherlands.

*Vodafone KK Develops Contactless Smart Card Mobile Handset*, May 6, 2004, HiTEK Magazine, Dubai.

*SmartSD Card Structure*, Panasonic, no date.

\* cited by examiner

MULTI-INTERFACE COMPACT PERSONAL TOKEN APPARATUS AND METHODS OF USE

CROSS-REFERENCE TO RELATED APPLICATIONS

This is a non-provisional filing based on U.S. Ser. No. 60/520,698 filed Nov. 17, 2003 by Ryan, Comiskey, Knapich and Finn.

This is a non-provisional filing based on U.S. Ser. No. 60/562,204 filed Apr. 14, 2004 by Comiskey, Finn and Ryan.

This is a non-provisional filing based on U.S. Ser. No. 60/602,595 filed Aug. 18, 2004 by Finn.

BACKGROUND OF THE INVENTION

1. Technical Field

This invention relates generally to smart card technology.

2. Related Art

A smart card resembles a credit card in size and shape. (See ISO 7810). The inside of a smart card usually contains an embedded 8-bit microprocessor. The microprocessor is under a gold contact pad on one side of the card. Smarts cards may typically have 1 kilobyte of RAM, 24 kilobytes of ROM, 16 kilobytes of programmable ROM, and an 8-bit microprocessor running at 5 MHz. The smart card uses a serial interface and receives its power from external sources like a card reader. The processor uses a limited instruction set for applications such as cryptography. The most common smart card applications are:

Credit cards
Electronic cash
Computer security systems
Wireless communication
Loyalty systems (like frequent flyer points)
Banking
Satellite TV
Government identification Smart cards can be used with a smart-card reader attachment to a personal computer to authenticate a user. (However, these readers are relatively costly, and have not been well accepted by users.) Web browsers also can use smart card technology to supplement Secure Sockets Layer (SSL) for improved security of Internet transactions. The American Express Online Wallet shows how online purchases work using a smart card and a PC equipped with a smart-card reader. Smart-card readers can also be found in vending machines.

There are three basic types of smart cards: contact chip, contactless and dual interface (DI) cards.

A contact smart card (or contact chip card) is a plastic card about the size of a credit card that has an embedded integrated circuit (IC) chip to store data. This data is associated with either value or information or both and is stored and processed within the card's chip, either a memory or microprocessor device.

The predominant contact smart cards in consumer use are telephone cards as a stored value tool for pay phones and bank cards for electronic cash payments. Contact smart cards require the placement of the card in a terminal or automatic teller machine for authentication and data transaction. By inserting the contact smart card into the terminal, mechanical and electrical contact is made with the embedded chip module.

Contactless smart cards have an embedded antenna connected to a microchip, enabling the card to pick up and respond to radio waves. The energy required for the smart card to manipulate and transmit data is derived from the electromagnetic field generated by a reader. Contactless smart cards do not require direct contact with the reader because they employ the passive transponder technology of Radio Frequency Identification (RFID). By just waving the card near the reader, secure identification, electronic payment transaction and authentication are completed in milliseconds.

Contactless chip card technology is based on two standards: ISO/IEC 14443 Type A and Type B (for proximity cards), and ISO/IEC 15693 (for vicinity cards). Cards that comply with these standards operate at the 13.56 MHz frequency. ISO/IEC 14443 products have a range of up to 10 cm (centimeters), while ISO/IEC 15693 products can operate at a range between 50 and 70 cm.

Dual interface (DI) cards, sometimes called combination chip cards, are microprocessor multi-function cards that incorporate both the functions of a contact chip card and a contactless card. Within the smart card is a microprocessor or micro-controller chip with radio frequency identification (RFID) capability that manages the memory allocation and file access. The on-board memory is shared and can be accessed either in contact or contactless mode.

This type of chip is similar to those found inside all personal computers and when implanted in a smart card, manages data in organised file structures, via a card operating system. This capability permits different and multiple functions and/or different applications to reside on the card.

A dual interface (DI) card is ideal for single and multi-application markets ranging from micro-payment (convenient alternative to low value cash transaction) to e-commerce and from ticketing in mass transit to secure identification for cross border control. Originally, such cards were intended to be used in conjunction with a reader connected to a PC for downloading tickets, tokens, or electronic money via the contact interface and used in contactless mode in the application for physical access or proximity payment.

Passive radio frequency identification (RFID) devices derive their energy from the electromagnetic field radiated from the reader. Because of international power transmission restrictions at the frequencies of 125 KHz and 13.56 MHz, the contactless integrated circuits are generally low voltage and low power devices. Read/Write circuits use low voltage EEPROM and low power analogue cells. The read/write memory capacity in transponders, contact smart cards, contactless memory based smart cards, dual interface smart cards (contact & contactless) and multi-interface microcontrollers is generally limited to approximately 64 kilobytes.

The dual interface (DI) smart cards typically have an 8, 16 or 32 bit microprocessor controller, operate at a low voltage of 1.8V–5V and run at an internal frequency of 5 or 15 MHz. The open platform architecture includes memory management, non volatile memory, contactless interfaces and security features such as Advanced Crypto Engine (ACE) 1100 bit, triple DES encryption and RSA.

High performance crypto controllers with multiple interfaces such as USB, ISO 14443 Type A, B, Felica have been developed for multi-functional smart cards in applications such as security access, healthcare, electronic purse, banking etc.

The main focus of the smart card industry has been on secure card applications, where large memory capacity is not of paramount importance, and/or where pertinent information and application software is stored at a centralised server location.

Another market area that has been evolving in recent years is memory, particularly for computing devices which are capable of interacting with large amounts of data and implementing sophisticated functionality, such as laptops, cameras, mobile phones, PDAs, MP3 players, and the like.

The main focus of the flash drive industry is on high density memory (using NAND flash memory cells) and current USB key chain products from the market leaders incorporate an 8-Gigabyte flash memory chip, managed by a 32 bit micro-controller.

These large capacity, personal, portable storage devices are for decentralised applications to transport confidential business documents, multimedia files, photos, music files, address book, favorite web sites, games, etc.

Apart from using USB tokens for file storage, they are also used for desktop settings, screen lock, network login & access control, log book, user authentication (storing digital signatures, certificates, key sets, finger-based biometric templates, usernames and passwords), digital content and transaction security as well as enterprise and Internet security.

A USB token can also be used to download emails, remotely access a PC or to open a customised browser that allows the user to surf the Web with total privacy.

Recent developments in USB flash memory drives have resulted in CDROM-like auto-run devices that automatically execute a file when the USB token is inserted into a PC. The read-only and auto-run contents are installed during the manufacturing process. Examples of auto-run contents include opening a website, running a demo application, showing a presentation, making a product pitch, providing customers with discount coupons etc.

Related Patents and/or Publications

U.S. Patent Publication No. 2003/0028797 discloses integrated USB connector for personal token. A personal key having an inexpensive and robust integrated USB connector is disclosed. The apparatus comprises a circuit board having a processor and a plurality of conductive traces communicatively coupling the processor to a peripheral portion of the circuit board. The plurality of conductive traces includes, for example, a power trace, a ground trace, and at least two signal traces. The apparatus also comprises a first housing, having an aperture configured to accept the periphery of the circuit board therethrough, thereby presenting the plurality of conductive traces exterior to the aperture. The apparatus also comprises a shell, surrounding the plurality of conductive traces, the shell including at least one locking member interfacing with the first housing.

U.S. Patent Publication No. 2002/0011516 discloses smart card virtual hub. A smart card virtual hub combines a ISO7816 compliant smart card reader interface with a USB hub that provides one or more attachment points for connection of devices to the USB bus, thereby interfacing such devices to the host computer. The hub in the presently preferred embodiment of the invention provides one port to which one USB functional device, such as a keyboard, may be attached. The attached keyboard shares a common USB bus bandwidth with the internal embedded smart card reader through a host-scheduled, token-based communication protocol that is handled by the USB driver and the device driver.

U.S. Patent Publication No. 2003/0102380 discloses a memory card and a method for operating a memory card, the memory card comprising: a memory mass storage; a first data interface with a contacting interface and a high data transfer rate; a second data interface with a contact-less interface. In a preferred embodiment, a memory card controller is included for selecting a first data line from said first data interface or a second data line from said second data interface to communicate with said memory mass storage based on a criteria.

U.S. Patent Publication No. 2003/0087601 discloses an apparatus, system and method for communicating between a personal device and a host computer. The apparatus comprises means for wireless communication, for enabling communication with a personal device (which also comprises means for wireless communication) and means for wired communication for enabling communication with the host computer (which also comprises means for wired communication). A controller installed within the apparatus, controls the data transfer between the wireless and wired communication interfaces of the apparatus. The controller may perform additional computing operations, such as security related operations (e.g. digitally signing a document, ciphering, and so forth). The apparatus may further comprise a smartcard chip, for securely storing information, and also for performing the additional computing operations. Implementations of the invention can be carried out in order to functionally connect a personal device, such as PDA, mobile phone, and so forth, to a host computer, or with an application executed on the host computer. The apparatus may be used to for security implementations, e.g. provision of PINs, keys, passwords, digitally signing of documents, and so forth. The personal device may also be used as input means for the apparatus, thereby enabling a large number of implementations, including applications with relevancy to cellular telephony. WIPO Publication No. WO 01/96990 discloses USB-Compliant Personal Key Using a Smartcard Processor and a Smartcard Reader Emulator. A compact, self-contained, personal key is disclosed. The personal key comprises a USB-compliant interface releaseably coupleable to a host processing device operating under command of an operating system; a smartcard processor having a smartcard processor-compliant interface of communicating according to a smartcard input and output protocol; and an interface processor, communicatively coupled to the USB-compliant interface and to the smartcard processor-compliant interface, the interface processor implementing a translation module for interpreting USB-compliant messages into smartcard processor-compliant messages and for interpreting smartcard processor-compliant messages into USB-compliant messages.

WIPO Publication No. WO 00/42491 discloses USB-Compliant Personal Key with Integral Input and Output Devices. A compact, self-contained, personal key is disclosed. The personal key comprises a USB-compliant interface (206) releasably coupleable to a host processing device (102); a memory (214); and a processor (212). The processor (212) provides the host processing device (102) conditional access to data storable in the memory (214) as well as the functionality required to manage files stored in the personal key and for performing computations based on the data in the files. In one embodiment, the personal key also comprises an integral user input device (218) and an integral user output device (222). The input and output devices (218, 222) communicate with the processor (212) by communication paths (220, 222) which are independent from the USB-compliant interface (206), and thus allow the user to communicate with the processor (212) without manifesting any private information external to the personal key.

WIPO Publication No. WO 01/39102 discloses PORTABLE READER FOR SMART CARDS. A portable reader (1) for smart cards (7) is described that comprises: a support body (3) containing at least one slot (5) for inserting and reading a smart card (7); interface means (9) connected to the support body (3); interface means (9) connected to the support body (3); means (13) for keeping and aligning the smart card (7); and a managing microprocessor contained inside the support body (3) and connected to the interface means (9) and the reading means for smart cards (7).

U.S. Pat. No. 5,761,648 discloses interactive marketing network and process using electronic certificates. A data processing system issuing electronic certificates through "online" networks of personal computers, televisions, or other devices with video monitors or telephones. Each electronic certificate includes transaction data and identification data, and can be printed out on a printing device linked to a consumer's personal input device, or electronically stored in a designated data base until a specified expiration date. The certificate can be used for various purposes, including use as a coupon for a discounted price on a product or service, proof of a gift or award, proof of reservation, or proof of payment. Consumers access the data processing system online, browse among their choices, and make their selections. The data processing system provides reports on the selected certificates and their use following selection. Certificate issuers also have online access to the data processing system and can create or revise offers, and provide various instructions pertaining to the certificates, including limitations as to the number of certificates to be issued in total and to each individual consumer. (see also www.coolsavings.com)

U.S. Pat. No. 6,694,399 discloses method and device for universal serial bus smart card traffic signalling. A method and device are disclosed for detecting successful transfers between a Universal Serial Bus (USB) port and a USB smart card and generating a signal that provides an indication of the USB transaction activity. This USB transaction activity signal is modulated according to the USB transaction activity and drives a Light Emitting Diode (LED) in a preferred embodiment of the invention. A counter internal to the USB smart card scales the transaction activity signal such that it is perceptible to the user. Because the current through the LED depends upon the USB transaction activity, the brightness of the LED varies according to the USB transaction activity. The LED may be driven from a current mirror sink or source, or a current switch sink or source.

GLOSSARY, DEFINITIONS, BACKGROUND

The following terms may be used throughout the descriptions presented herein and should generally be given the following meaning unless contradicted or elaborated upon by other descriptions set forth herein. Many of the definitions below were taken from http://www.webopedia.com. Some of the terms set forth below may be registered trademarks (®).

BIOS Short (e.g., acronym or abbreviation) for "basic input/output" system. BIOS is the built-in software that determines what a computer can do without accessing programs from a disk. On PCs, the BIOS contains all the code required to control the keyboard, display screen, disk drives, serial communications, and a number of miscellaneous functions.

Bluetooth A wireless technology developed by Ericsson, Intel, Nokia and Toshiba that specifies how mobile phones, computers and PDAs interconnect with each other, with computers, and with office or home phones. The technology enables data connections between electronic devices in the 2.4 GHz range at 720 Kbps (kilo bits per second) within a 30-foot range. Bluetooth uses low-power radio frequencies to transfer information wirelessly between similarly equipped devices.

CDMA Short for "Code-Division Multiple Access". CDMA is a digital cellular technology that uses spread-spectrum techniques. Unlike competing systems, such as GSM, that use TDMA, CDMA does not assign a specific frequency to each user. Instead, every channel uses the full available spectrum. Individual conversations are encoded with a pseudo-random digital sequence.

cell phone Also referred to as "mobile phone" or "handset". A cell phone today is a mobile communication device used not only for making calls, but it is lately used as media device, transaction device, data storage device using SD or MMC cards for that. So called smart cellular phones are also Internet enabled devices allowing the user to connect to and browse the world wide web, send and receive email, and some also incorporate the functionality of a PDA.

cf. Short for the Latin "confer". As may be used herein, "compare".

computer A programmable machine. The two principal characteristics of a computer are:
  It responds to a specific set of instructions in a well-defined manner.
  It can execute a prerecorded list of instructions (a program). Modern computers are electronic and digital. The actual machinery—wires, transistors, and circuits—is called hardware; the instructions and data are called software.

DNS Short for "Domain Name System" (or Service or Server). DNS is an Internet service that translates domain names into IP addresses. Because domain names are alphabetic, they're easier to remember. The Internet however, is really based on IP addresses. Every time you use a domain name, therefore, a DNS service must translate the name into the corresponding IP address. For example, the domain name www.example.com might translate to 198.105.232.4. The DNS system is, in fact, its own network. If one DNS server doesn't know how to translate a particular domain name, it asks another one, and so on, until the correct IP address is returned.

DSL Short for "Digital Subscriber Line". DSL technologies use sophisticated modulation schemes to pack data onto copper wires. They are sometimes referred to as last-mile technologies because they are used only for connections from a telephone switching station to a home or office, not between switching stations. The two main categories of DSL are ADSL (asymmetric DSL) and SDSL (symmetric DSL). ADSL supports data rates of from 1.5 to 9 Mbps (million bits per second) when receiving data (known as the downstream rate) and from 16 to 640 Kbps when sending data (known as the upstream rate). Two other types of DSL technologies are High-data-rate DSL (HDSL) and Very high DSL (VDSL).

EEPROM Short for "electrically erasable programmable read-only memory". EEPROM is a special type of PROM that can be erased by exposing it to an electrical charge. Like other types of PROM, EEPROM retains its contents even when the power is turned off. EEPROM is similar to flash memory (sometimes called flash EEPROM). The principal difference is that EEPROM requires data to be written or erased one byte at a time whereas flash memory allows data to be written or erased in blocks. This makes flash memory faster.

e.g. Short for the Latin "exempli gratia". Also "eg" (without periods). As may be used herein, means "for example".

etc. Short for the Latin "et cetera". As may be used herein, means "and so forth", or "and so on", or "and other similar things (devices, process, as may be appropriate to the circumstances)".

Ethernet A local-area network (LAN) architecture developed by Xerox Corporation in cooperation with DEC and Intel in 1976. Ethernet uses a bus or star topology and supports data transfer rates of 10 Mbps. The Ethernet specification served as the basis for the IEEE 802.3 standard, which specifies the physical and lower software layers. Ethernet uses the CSMA/CD access method to handle simultaneous demands. It is one of the most widely implemented LAN standards. A newer version of Ethernet, called 100Base-T (or Fast Ethernet), supports data transfer rates of 100 Mbps. And the newest version, Gigabit Ethernet supports data rates of 1 gigabit (1,000 megabits) per second.

expansion card A stamp-sized add-on memory that a user inserts into an expansion slot of a device such as a PDA. Expansion cards can contain applications, songs, videos, pictures, and other information in a digital format. They also come in three 'flavors': MultiMediaCard™ (MMC), SD (Secure Digital) card and SDIO (Secure Digital Input/Output) card. Mini SD Card Firewall A system designed to prevent unauthorized access to or from a private network. Firewalls can be implemented in both hardware and software, or a combination of both. Firewalls are frequently used to prevent unauthorized Internet users from accessing private networks connected to the Internet, especially intranets. All messages entering or leaving the intranet pass through the firewall, which examines each message and blocks those that do not meet the specified security criteria. There are several types of firewall techniques:

Packet filter: Looks at each packet entering or leaving the network and accepts or rejects it based on user-defined rules. Packet filtering is fairly effective and transparent to users, but it is difficult to configure. In addition, it is susceptible to IP spoofing.

Application gateway: Applies security mechanisms to specific applications, such as FTP and Telnet servers. This is very effective, but can impose a performance degradation.

Circuit-level gateway: Applies security mechanisms when a TCP or UDP connection is established. Once the connection has been made, packets can flow between the hosts without further checking.

Proxy server: Intercepts all messages entering and leaving the network. The proxy server effectively hides the true network addresses.

In practice, many firewalls use two or more of these techniques in concert. A firewall is considered a first line of defense in protecting private information. For greater security, data can be encrypted.

flash memory A special type of EEPROM that can be erased and reprogrammed in blocks instead of one byte at a time. Many modern PCs have their BIOS stored on a flash memory chip so that it can easily be updated if necessary. Such a BIOS is sometimes called a flash BIOS. Flash memory is also popular in modems because it enables the modem manufacturer to support new protocols as they become standardized.

GSM/GPRS Short for "Global System for Mobile Communications"/"General Packet Radio Service". A type of mobile phone network used throughout most of the world. GPRS enabled networks offer 'always-on', higher capacity, Internet-based content and packet-based data services. This enables services such as color Internet browsing, email on the move, powerful visual communications, multimedia messages and location-based services. Used by AT&T, Cingular Wireless and T-Mobile (and others) in the USA and Rogers Wireless and Fido in Canada. GSM 11.11 is a specification for Global System for Mobile communications.

handheld A portable electronic device that fits in a hand or pocket and functions as a personal organizer, but can also contain other applications that enable you to listen to music, view photos, read eBooks, play games, view and edit documents, and more. Also commonly called a Personal Digital Assistant (PDA).

i.e. Short for the Latin "id est". As may be used herein, "that is".

IEC Short for "International Electrotechnical Commission".

IEEE Short for "Institute of Electrical and Electronics Engineers". The IEEE is best known for developing standards for the computer and electronics industry.

IEEE 802.11 The IEEE standard for wireless Local Area Networks (LANs). It uses three differentphysical layers, 802.11a, 802.11b and 802.11g.

IEEE 1394 IEEE 1394 (also known as FireWire® and iLINK™) is a high-bandwidth isochronous (real-time) interface for computers, peripherals, and consumer electronics products such as camcorders, VCRs, printers, PCs, TVs, and digital cameras. With IEEE 1394-compatible products and systems, users can transfer video or still images from a camera or camcorder to a printer, PC, or television (TV), with no image degradation.

Internet A global network connecting millions of computers for the exchange of data, news and opinions. Unlike online services, which are centrally controlled, the Internet is decentralized by design. Each Internet computer, called a host, is independent. Its operators can choose which Internet services to use and which local services to make available to the global Internet community. Remarkably, this anarchy by design works exceedingly well. There are a variety of ways to access the Internet. Most online services, such as America Online, offer access to some Internet services. It is also possible to gain access through a commercial Internet Service Provider (ISP).

I/O Short for "Input/Output".

ISO Short for "International Organization for Standardization." (Note that ISO is not an acronym; instead, the name derives from the Greek word iso, which means equal.)

ISO 14443 ISO 14443 RFID cards; contactless proximity cards operating at 13.56 MHz in up to 5 inches distance. ISO 14443 defines the contactless interface smart card technical specification.

ISO 7810 Defines the size and shape of cards. All credit cards and debit cards, and most ID are the same shape and size, as specified by the ISO 7810 standard. Smart cards follow specifications set out in ISO 7816, and contactless smart cards follow the ISO 14443 specification.

ISO 7816 Regarding smart card, ISO 7816 defines specification of contact interface IC chip and IC card.

ISO 15693 ISO standard for contactless integrated circuits, such as used in RF-ID tags. ISO 15693 RFID cards; contactless vicinity cards operating at 13.56 MHz in up to 50 inches distance. (ISO 15693 is typically not used for financial transactions because of its relatively long range as compared with ISO 14443.)

LAN Short for "Local Area Network". A computer network that spans a relatively small area. Most LANs are confined to a single building or group of buildings. However, one LAN can be connected to other LANs over any distance via telephone lines and radio waves. A system of LANs connected in this way is called a wide-area network (WAN).

memory Storage for applications, photos, videos and other data in a device, measured in megabytes (MB). The more memory, the more applications, photos, videos and other data a device can store. Four types of memory are available:
1) fixed built-in random access memory (RAM) included with the device,
2) add-on memory, sold separately, in the form of expansion cards of various capacities,
3) fixed built-in read-only memory (ROM) containing the operating system and built-in applications and
4) built-in flash memory. See also non-volatile memory.

MMC Short for "Multi-Media Card". Similar in form factor to an SD card. The difference between an SD card and an MMC card is speed, durability, write-protection, copyright protection, and size.

Modem Short for "modulator-demodulator". A modem is a device or program that enables a computer to transmit data over, for example, telephone or cable lines. Computer information is stored digitally, whereas information transmitted over telephone lines is transmitted in the form of analog waves. A modem converts between these two forms. There is one standard interface for connecting external modems to computers called RS-232. While the modem interfaces are standardized, a number of different protocols for formatting data to be transmitted over telephone lines exist.

NFC Short for "Near Field Communication". NFC is a contactless connectivity technology that enables short-range communication between electronic devices. If two devices are held close together (for example, a mobile phone and a personal digital assistant), NFC interfaces establish a peer-to-peer protocol, and information such as phone book details can be passed freely between them. NFC devices can be linked to contactless smart cards, and can operate like a contactless smart card, even when powered down. This means that a mobile phone can operate like a transportation card, and enable fare payment and access to the subway.

NFC is an open platform technology standardized in ECMA (European Computer Manufacturers Association) 340 as well as ETSI (European Telecommunications Standards Institute) TS 102 190 V1.1.1 and ISO/IEC 18092. These standards specify the modulation schemes, coding, transfer speeds, and frame format of the RF interface of NFC devices, as well as initialisation schemes and conditions required for data collision-control during initialisation—for both passive and active modes.

OSI Short for "Open System Interconnection". The OSI model defines a networking framework for implementing protocols in seven layers.

PC Short for "Personal Computer". A PC is a single-user computer based on a microprocessor. In addition to the microprocessor, a personal computer has a keyboard for entering data, a monitor for displaying information, and a storage device for saving data.

PCMCIA Short for "Personal Computer Memory Card International Association". The PCMCIA is an international trade association and standards body cognisant of several device standards including PC Cards, Miniature Card, and others. PCMCIA is also used to describe PC Cards themselves, often referred to as PCMCIA Cards.

PDA Short for "personal digital assistant". A PDA is a handheld device that combines computing, telephone/fax, Internet and networking features. A typical PDA can function as a cellular phone, fax sender, Web browser and personal organizer. Unlike portable computers, most PDAs began as pen-based, using a stylus rather than a keyboard for input. This means that they also incorporated handwriting recognition features. Some PDAs can also react to voice input by using voice recognition technologies. PDAs of today are available in either a stylus or keyboard version.

protocol An agreed-upon format for transmitting data between two devices. The protocol determines the following:
the type of error checking to be used
data compression method, if any
how the sending device will indicate that it has finished sending a message
how the receiving device will indicate that it has received a message RJ-45 Short for "Registered Jack-45". RJ-45 is an eight-wire connector used commonly to connect computers onto a local-area networks (LAN), especially Ethernets. RJ-45 connectors look similar to the ubiquitous RJ-11 connectors used for connecting telephone equipment, but they are somewhat wider.

RFID Short for "Radio Frequency Identification". An RFID device interacts, typically at a limited distance, with a "reader", and may be either "passive" (powered by the reader) or "active" (having its own power source, such as a battery).

SD Short for "Secure Digital". SD is a technology standard for providing portable devices with non-volatile memory/storage and peripheral I/O expansion capability. On some devices this standard is implemented in the form of SD memory expansion cards, used to store digital information like applications, databases, photos, text, audio, video or MP3 music files, and an SD/SDIO expansion slot. The SD standard makes it possible to transfer information between devices that support SD expansion cards (e.g. transfer photos between a digital camera and a PDA by exchanging the SD expansion card), assuming both devices support the file format used for the transferred information (e.g. JPEG image file).

SDIO Short for "Secure Digital Input/Output". SDIO is a part of the SD memory specification. It enables I/O (input/output) expansion for add-ons such as serial, modem, camera or GPS (global positioning system) cards. Whereas SD is only used for storage expansion cards, an SDIO capable expansion slot can also support SD expansion cards, while an SD-capable slot may not support an SDIO expansion card.

SIM Short for "Secure Identity Module" or "Subscriber Identification/Identity Module". A SIM card inscribed with a customer's information and designed to be inserted into any mobile telephone. Usually SIM card phones work by GSM technology. The SIM card contains a user's GSM mobile account information. SIM cards are portable between GSM devices—the user's mobile subscriber information moves to whatever device houses the SIM.

SAM Short for "Secure Application Module". A SAM a hardware module within a transaction device (e.g. smart card terminal) that controls all security related transaction and communication between the device and the web, PC, etc. The SAM can only be accessed by the scheme operator, it is usually tamper proof for everybody else software Computer instructions or data. Anything that can be stored electronically is software. Software is typically stored in binary form (ones and zeros, represented by two distinctive states) on a storage medium, such as a floppy disc, hard drive, memory device, or the like, all of which may generally and broadly be referred to as "hardware". The apparatus or system or device which responds to software instructions or manipulates software data may generally and broadly be referred to as a "computer". Software is sometimes abbreviated as "S/W". Software is often divided into the following two categories:

systems software: Includes the operating system and all the utilities that enable the computer to function.

applications software: Includes programs that do real work for users. For example, word processors, spreadsheets, and database management systems fall under the category of applications software.

software The non-hardware part of a computer, handheld (e.g., PDA) or smartphone ("smart" cellular telephone) consisting of instructions used to operate these devices. Includes applications that are added to, or included on, the device, as well as the operating system built into a device.

SSL Short for "Secure Sockets Layer". SSL is a secure tunnel that is created automatically when a user connects to a page that requires secure data transmission. (i.e., any page whose URL begins with https://)

TCP/IP Short for "Transmission Control Protocol/Internet Protocol". TCP/IP has become the basic protocol that defines how information is exchange over the Internet. IP software sets the rules for data transfer over a network, while TCP software ensures the safe and reliable transfer of data. The abbreviation TCP/IP is commonly used to represent the whole suite of internetworking software.

TDMA Short for "Time Division Multiple Access", a technology for delivering digital wireless service using time-division multiplexing (TDM). TDMA works by dividing a radio frequency into time slots and then allocating slots to multiple calls. In this way, a single frequency can support multiple, simultaneous data channels. TDMA is used by the GSM digital cellular system.

tamper-resistant area An area, within a memory device which is hardware protected against tampering. A pure software approach to tamper with the tamper-resistant area will not work.

UDP Short for "User Datagram Protocol". UDP is a minimal message-oriented transport layer protocol.

URL Short for "Uniform Resource Locator". Web pages use links to connect users to other content that may or may not be located on the same server as the page from which it links. The address used to identify the location of this content is called a URL.

USB Short for "Universal Serial Bus". USB is a serial bus standard (standardized communications protocol) that enables data exchange between electronic devices. USB supports data transfer rates of up to 12 Mbps (megabits per second). A single USB port can be used to connect up to 127 peripheral devices, such as mice, modems, and keyboards. USB also supports plug-and-play installation and "hot plugging". USB is expected to completely replace serial and parallel ports. Hi-Speed USB (USB 2.0) similar to FireWire technology, supports data rates up to 480 Mbps.

A USB flash memory drive is a portable storage device, which functions like a hard drive or a removable drive when inserted into the USB port of a PC. Primarily used to store, backup, download and transfer data from one computer to another. These USB key chain memory devices have replaced floppy disk drives in the market.

A USB Token is a portable, hand-held key fob that is the size of a standard car key. It is embedded with a computer microchip that can store, access and process data. USB tokens have an operating system, temporary memory and non-volatile, "updateable" file/object storage memory, affording capabilities greater than those of traditional smart cards. They can generate secret cryptographic keys (Public & Private Key Infrastructure) and store private data (digital certificates, digital signatures, biometric identifiers, passwords, system settings etc).

UWB UWB is short for "Ultra Wide Band". UWB is a wireless communications technology that transmits data in short pulses which are spread out over a wide swath of spectrum. Because the technology does not use a single frequency, UWB enjoys several potential advantages over single-frequency transmissions. For one, it can transmit data in large bursts because data is moving on several channels at once. Another advantage is that it can share frequencies that is used by other applications because it transmits only for extremely short periods, which do not last long enough to cause interference with other signals.

VPN Short for "Virtual Private Network". A VPN provides a way to remotely and securely access a corporate network via the Internet. VPN is an Internet-based system for information communication and enterprise interaction. A VPN uses the Internet for network connections between people and information sites. However, it includes stringent security mechanisms so that sending private and confidential information is as secure as in a traditional closed system. A network which has the appearance and functionality of a dedicated line, but which is really like a private network within a public one, because it is still controlled by the telephone company, and its backbone trunks are used by all customers.

Wi-Fi Short for "Wireless Fidelity". Wireless technology, also known as 802.11b, that enables you to access the Internet, to send and receive email, and browse the Web anywhere within range of a Wi-Fi access point, or HotSpot.

wireless Technology that allows a user to communicate and/or connect to the Internet or mobile phone networks without physical wires. Wi-Fi, Bluetooth®, CDMA and GSM are all examples of wireless technology.

WLAN Short for "wireless local-area network". Also referred to as LAWN. A WLAN is a type of local-area network that uses high-frequency radio waves rather than wires for communication between nodes (e.g., between PCs).

BRIEF DESCRIPTION (SUMMARY) OF THE INVENTION

The invention is generally a compact personal token apparatus which can be plugged into a personal computer and interfaced with the virtual world of the Internet. The apparatus (or, as will be evident, a portion of a modular apparatus) can then be removed from the personal computer and used to conduct real world transactions. The compact personal token apparatus is suitably in the general form of a fob, resembling a USB memory fob. The compact personal token apparatus comprises a contactless interface and may also comprise a wireless interface.

With regard to a personal token apparatus being something "which can be plugged into a personal computer", it is clearly within the scope of this invention, and based on the teachings set forth herein one of ordinary skill in the art would recognize that:

the "token apparatus" can take on a form other than that of resembling a USB memory fob, as long as it is minimally capable of storing software (data and/or instructions); and the "personal computer" can be any apparatus which is capable of interacting with the token apparatus (or the like), so long as the apparatus is a device capable of interacting with the software contained in the token apparatus (or the like).

In light of these considerations, and other comparisons (an exemplary "other comparison" would be the well-accepted definition of "software" set forth hereinabove which defines "software" as the non-hardware part of a computer, handheld or smartphone . . . ) set forth in this document, the preceding paragraph (i.e., "The invention is generally . . . comprises a wireless interface.") can reasonably and justifiably be read and interpreted as follows:

The invention is generally a compact personal token apparatus which can be by means of standard-compliant interfaces (described hereinbelow) connected to a personal computer and/or other internet capable devices such as; cell phones, personal digital assistants (PDA), digital media players, digital cameras etc. and interfaced with the virtual world of the Internet. The apparatus (or, as will be evident, a portion of a modular apparatus) can then be removed from the personal computer and used to conduct real world transactions. The compact personal token apparatus is suitably in the general form of a fob, resembling a USB memory fob. In some implementations it will take the general form factor required of the standard compliant interface such as SD and Mini SD cards, Multi Media Cards (MMC), PCMCIA Cards, etc. The compact personal token apparatus generally comprises a wireless interface.

According to a feature of the invention, the compact personal token apparatus (or equivalent) may remain in the apparatus capable of interacting with the personal token (e.g., cell phone, PDA), when the personal token device communicates contactlessly in the real world. It does not necessarily have to be removed from the host device.

According to the invention, a compact personal token apparatus comprises a connection module; a translation module; a processor module; and an input/output module. The connection module is for interfacing the personal token apparatus with a an Internet-capable appliance; and the interface is selected from the group consisting of USB, FireWire, IR, Bluetooth, standard serial port, WLAN. The Internet-capable appliance may comprise a device selected from the group consisting of personal computer (PC), laptop, PDA, MP3 player and cellphone. The translation module moves signals between a USB interface and a smart card interface. The smart card interface may be selected from the group consisting of ISO 7816, ISO 14443 and ISO 15693.

The processor module may comprise a dual interface (DI) chip. The processor module may incorporate the translation module. The output module comprises an RF antenna and a modulator. The apparatus may further comprise flash memory. The translation module may move signals between a USB interface and a wireless interface. The translation module may be incorporated in the processor module to that the device can go directly from USB to wireless without being limited by smart card software architecture limitations. The apparatus may have the general physical configuration of a conventional USB memory fob. The apparatus may be modular, having a first physical module containing the input module and the translation module; and a second physical module containing the processor module and the output module. The output module may comprise contacts for interfacing with a smart card. The fob is capable of interfacing with the Internet and emulating a smart card. The apparatus may incorporate firewall functionality to protect the Internet-capable applicance. The apparatus may comprise interfaces for ISO contact, contactless, USB and DSL. The apparatus may comprise an LCD screen. The apparatus may comprise at least one switch. The apparatus may comprise at least one LED.

According to the invention, a compact personal token apparatus comprises a standard-compliant contact based interface, the contact based interface complying to at least one standard interface selected from the group consisting of USB, IEEE 1394, PCMCIA, Compact Flash, Multi Media, Memory Stick, Smart Media, Secure Digital, mini SD, IBM Micro Drive, and any similar standard interface.

The apparatus may further comprise a standard-compliant contactless interface complying to one or more of the following standard interfaces: RFID-contactless interface according to ISO 14443 and ISO 15693 as well as similar interfaces, and a wireless interface complying to one or more of the following standard interfaces: Bluetooth compatible interface, WLAN 802.11, UWB, and any similar interface.

The apparatus may further comprise a standard-compliant interface releaseably coupleable to a host processing device, this being under the command of an operating system; an interface module providing translation of standard-compliant contact based interface messages to ISO 7816 compliant messages and providing the translation of ISO 7816 compliant messages to standard-compliant contact based interface messages; a dual interface processor having an ISO 7816 compliant interface communicating through the interface module with the host processing device, the dual interface processor communicating through an RFID-contactless interface and connected to an inductive antenna.

The apparatus may further comprise a standard-compliant interface releaseably coupleable to a host processing device, this being under the command of an operating system; an interface module providing translation of standard-compliant contact based interface messages via a memory chip to Bluetooth/WLAN 802.11 device compatible compliant messages, and providing the translation of Bluetooth/WLAN 802.11 device compliant messages via a memory chip to standard-compliant contact based interface messages; a Bluetooth/WLAN 802.11 device having a Bluetooth/WLAN 802.11 compliant interface communicating through the interface module with the host processing device via a memory chip; the same Bluetooth/WLAN 802.11 device communicating through its Bluetooth/WLAN 802.11 compatible interface.

The apparatus may further comprise a dual interface chip (processor) inside the personal token which can be directly programmed by a software running on the host system using the interface processor without the need for an external contact based dual interface read/write device. The software may be web based, allowing for downloading information from the web directly into the dual interface processor memory (for example, event tickets) thus linking the virtual world to the real world. The downloaded information may be used in the real world by using the contactless RFID interface.

The information stored in the personal token via the standard contact based interface may be used for personal identification, secure network logon, access control, e-ticketing, e-payment and similar applications using either the standard compliant interface or the RFID-compliant interface. Information received through the RFID-interface can be stored in the memory of the personal token and can then be provided to the host processing device via the standard interface, thus allowing a complete information exchange between the virtual world and the real world.

The contactless and/or wireless module may be releaseably coupleable from the interface module.

The dual interface processor may be mounted in a dual interface card complying to ISO 7810 or a 7816 compliant SIM module and connected norms; the compact personal token apparatus provides physical contacts for the dual interface card, or a 7816 compliant form factor; and when connected, the dual interface or SIM card can communicate with the host processing device through the interface module inside the personal token and, once the communication is done, the card can be released from the personal token and can be used then in the real world.

The apparatus may further comprise a processor module; and additional memory selected from the group consisting of flash memory and EEPROM device powered and addressed by the processor module; wherein the additional memory can be used for user authentication and to run applications.

The apparatus may further comprise a standard-compliant smart card contact interface complying to ISO 7816, or any similar interface.

The apparatus may further comprise a connection module, connecting the personal token apparatus to a host device such as PC, PDA, smart cellular phone or similar device, either directly or with the help of a standard reader device such as a memory card reader.

The apparatus may further comprise a standard-compliant interface releaseably coupleable to a host processing device, this being under the command of an operating system; and a translation module, translating messages incoming from the contact based interface, and translating messages to the host device from the personal token apparatus.

The apparatus may further comprise a processor module, preparing messages to be sent by the contactless and/or wireless interfaces and interpreting messages received via the interface(s).

The apparatus may further comprise a triple interface (e.g., contact, contactless, USB) processor.

The apparatus may further comprise a quadruple interface (e.g., contact, contactless, USB, DSL) processor.

According to the invention, a method of interacting contactlessly and/or wirelessly comprises: providing a device; interfacing the device with a an Internet-capable appliance; and providing a smart card interface in the device.

The "compact personal token apparatus" may be referred to herein as "smart fob" (without prejudice to any trademark rights which may be claimed). Often it is simply referred to as the "apparatus" (no trademark rights implied). Various embodiments and methods of use are disclosed.

It will be appreciated that the "smart fob" of the present invention is not only capable of functioning like a smart card, but is also capable of much more.

The "smart fob" is capable of loading and storing information from the Internet, via a PC or other Internet capable device to its memory and then using the stored information via its contactless interface in the real world. The "smart fob" is also capable of exchanging information with a conventional smart card.

Based on the teachings set forth herein, it would readily be understood by one of ordinary skill in the art that the functionality of the present invention, in its various embodiments, could be realized in a different format than a fob and in a different manner than by plugging the fob into the USB port of a personal computer (PC). For example, the apparatus of the present invention can be embodied in a format (form factor) such as that of an SD (secure digital) card which can be plugged into any device having an appropriate interface for inserting an SD card, such as a laptop, palmtop, cell phone, digital camera, personal digital assistant (PDA), MP3 player, or the like.

In any of the embodiments discussed herein (particularly those using a PC), a memory card reader may be attached to the PC. (PCs in Europe commonly come with memory card readers for several different memory card formats including, but not limited to, Secure Digital (SD) card format.

Many exemplary features and embodiments of, as well as applications for the smart fob (or comparable) of the present invention are described hereinbelow.

Other objects, features and advantages of the invention will become apparent in light of the following description thereof.

BRIEF DESCRIPTION OF THE DRAWINGS

The structure, operation, and advantages of the present preferred embodiment of the invention will become further apparent upon consideration of the descriptions set forth herein, taken in conjunction with the accompanying figures (FIGS). The figures (FIGS) are intended to be illustrative, not limiting. Although the invention is generally described in the context of these preferred embodiments, it should be understood that it is not intended to limit the spirit and scope of the invention to these particular embodiments.

DETAILED DESCRIPTION OF THE INVENTION

This invention relates generally to devices, technology and applications for downloading and interacting with data and value from one "world" such as the virtual world of the Internet and, with the device, interacting, typically contactlessly, with another "world" such as the physical world of banking, stores (point of sale), physical access control, and the like.

Generally, this is done using a device running software and interacting with an Internet capable apparatus such as a personal computer (PC), a personal digital assistant (PDA) or a handset (Internet capable cell phone). In many embodiments, the device interacts with the physical world using a standard contactless smart card interface, such as ISO 14443 or 15693. In some embodiments, the device plugs into a PC using a standard contact interface, such as USB. Several embodiments and several applications applicable to various ones of the embodiments are discussed.

In an embodiment, the device is embodied in the form of a compact personal token apparatus, resembling a conventional USB memory fob (size, shape, form) which can be plugged into an apparatus such as a personal computer (PC) and interfaced with the virtual world of the Internet. The device is capable of loading and storing information from the Internet, via the PC to its flash memory (memory that can be erased and reprogrammed in blocks) or EEPROM and then using the stored information or value via its contactless interface in the real world. Similarly, the device is capable of implementing an auto-run application, when inserted into a personal computer (PC) connected to the Internet, and information exchanged and stored can be accessed in the real world application via its contactless interface. The memory space required for the auto-run application can reside completely in the device or only partially in the device. Additional memory space to complete the application can be located on the server of the ISP, trusted third party or host server. The apparatus is also capable of exchanging information with other devices having compatible interfaces.

The personal token apparatus will typically be referred to as a "device" to distinguish it from the "apparatus" that it plugs into. However it may occasionally still be referred to as "apparatus". Also the apparatus that the device plugs into to interact with the virtual world may also sometimes be referred to as "device", and may also be referred to as "appliance". Generally, the context will clarify the definition.

Figure 1A:
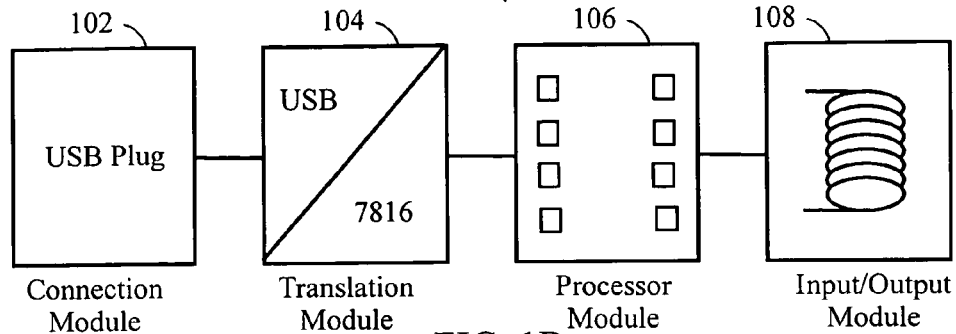
FIG. 1A is a schematic block diagram of an embodiment of the invention.

FIG. 1A is a schematic block diagram of an exemplary embodiment 100 of the invention employing a dual interface (DI) chip and having four modules, all interconnected as shown to provide the contemplated functionality of the present invention. The major components, mounted on a circuit board (PCB, not shown) and within a housing (not shown) are (from left-to-right):

a connection module 102;
a translation module 104;
a processor module 106; and
an input/output (I/O) module 108.

The connection module 102 is for interfacing the device with a personal computer (not shown) apparatus, or other appliance capable of communicating and interacting with remote servers and networks. In the example of the compact personal token apparatus of the present invention, the connection module can be a USB plug, for plugging directly into a personal computer (PC). Other possibilities for connecting (communicating) with the personal computer are FireWire, IR, Bluetooth, standard serial port, WLAN, etc., basically any suitable interface between an external memory/processing apparatus and a personal computer.

The connection module 102 is typically for inputting data to the device from the virtual world of the Internet, via the PC or other Internet capable appliance, and in some cases the device can or needs to also output data to the PC and/or to another entity via the Internet. The particular plug or connection interface which is used is whatever is available, either now or in the future. And the device is not limited to communicating with other entities via the "Internet", but can communicate via other networks or internets. These comments apply to other embodiments described herein.

The invention should not limited to a particular form of interface/communication protocol. The point is that the device can interact with the virtual world via an Internet-capable appliance. One of ordinary skill in the art to which the invention most nearly pertains will recognize, and it is within the scope of the invention that other possibilities for what has been described as "devices capable of communicating and interacting with remote servers and networks" are PDAs, cell phones, etc., not only personal computers—basically, any (what is referred to elsewhere as) "host device" or "host processing device".

The translation module 104 is for going (moving signals) from USB (the exemplary interface with the computer) to a smart card interface format, such as ISO 7816, and vice-versa. The translation module may comprise a Philips TDA8030 USB/7816. (ISO 7816 is a smart card contact interface.)

A micro-controller such as an 8 bit micro-controller (ST7 FSCR1E4M1) can be used as an interface translator chip (104) between the USB connection 102 and the processor module 106. (The processor could be mounted in a SIM module.)

Figure 1B:
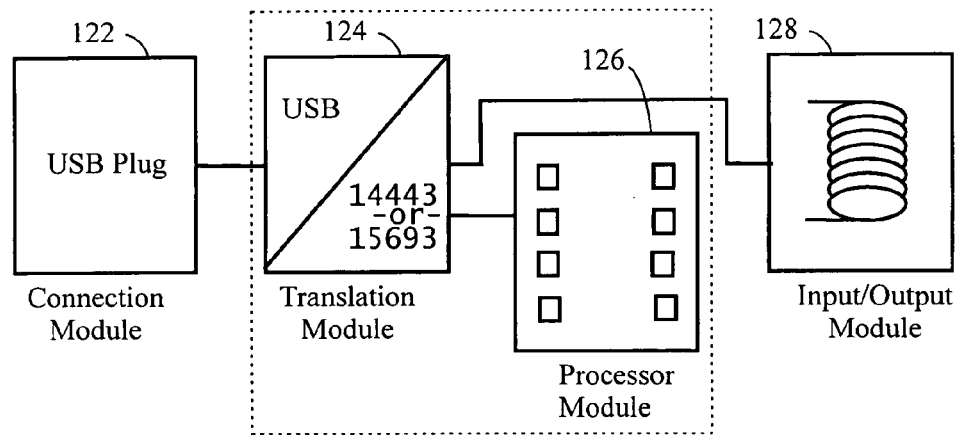
FIG. 1B is a schematic block diagram of an embodiment of the invention.

Alternatively, the translation module can go from USB to ISO 14443 or 15693 (contactless interfaces). The latter is shown in FIG. 1B, and is described hereinbelow. In going directly from USB to contactless, the device is not limited by the smart card software architecture (ISO 7816) limitations. The translation module in this case is a processor device, that will handle the data processing from USB to contactless.

The processor module 106 is for controlling operation of the compact personal token apparatus ("device") of the present invention and is preferably capable of operating as a dual-interface (DI) chip. For example, Mifare ProX, Infineon 66 series, etc. The dual interface chip is available from various vendors (e.g., Philips, Infineon, ST Microelectronic), and is capable of interfacing from ISO 7816 (contact interface) to either or both of ISO 14443 and 15693 (contactless interfaces).

The output module 108 comprises an RF antenna and a modulator, etc. Alternatively, the output module comprises a set of contacts for contacting the pads on a smart card (see FIGS. 3A and 3B below).

It should clearly be understood that, in this as well as in other embodiments described herein, that the module 108 is more than an "output" module sending data in only one direction, that rather it is a transceiver module adapted to transmit as well as receive data. The same can be said of the input module (e.g., 102 in that it facilitates two-way communication. It is only as a prosaic convenience that the modules 102 (e.g.) and 108 (e.g.) are labeled "input" and "output" respectively.

As mentioned above, alternatively, the translation module can go from USB to ISO 14443 or 15693. In other words, directly from USB to contactless.

FIG. 1B is a schematic block diagram of another exemplary embodiment 120 of the invention, also having four modules, all interconnected as shown to provide the contemplated functionality of the present invention. The major components, mounted on a circuit board (PCB, not shown) and within a housing (not shown) are (from left-to-right):

a connection module 122;
a translation module 124;
a processor module 126; and
an input/output (I/O) module 128.

As in the previous embodiment, the connection module 122 can comprise a USB plug or any suitable interface to a personal computer or other device (apparatus, appliance) capable of communicating and interacting with remote servers and networks.

As in the previous embodiment, the output module 128 can comprise an RF antenna and modulator, or alternatively a set of contacts for contacting the pads on a smart card.

Unlike the previous embodiment, in this embodiment the translation module 124 goes from USB to a contactless interface. Therefore, the processor module 126 does not need to be a dual interface (DI) chip. Rather, the processor module 126 could simply comprise a USB interface on one side and a contactless interface on the other. The memory of the processor could be used as temporary storage and the processor could handle the data encoding as well.

It is also within the scope of the invention that the processor module (e.g., 106 or 126) could include (incorporate) the translation module (e.g., 104 or 124) within the processor module itself, thus enabling an even more cost effective solution, enabling using a single chip approach for some, or even all of the embodiments discussed herein. (This is not explicitly shown, but one could envision, for example, simply merging the blocks 124 and 126 together, as indicated by the dashed line.)

Figure 1C:
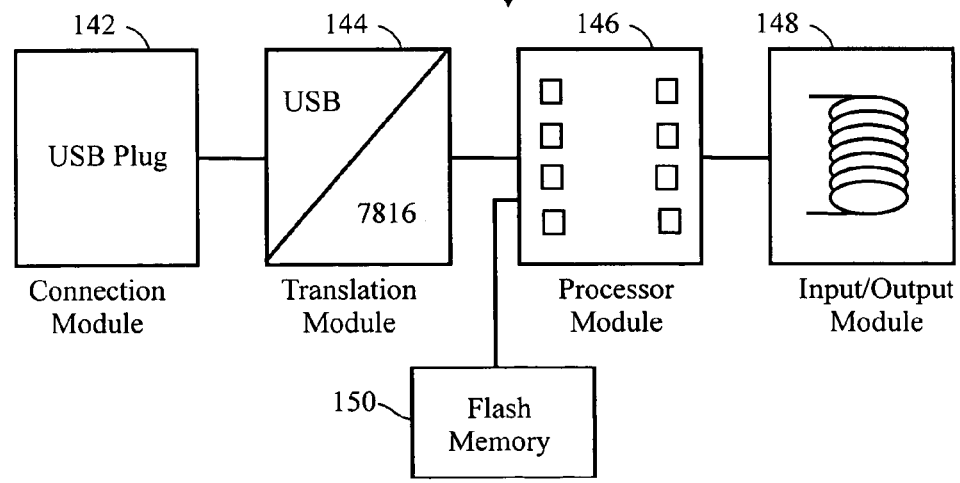
FIG. 1C is a schematic block diagram of an embodiment of the invention.

FIG. 1C is a schematic block diagram of another exemplary embodiment 140 of the invention, based on the embodiment 100 of FIG. 1A. The major components are:
 a connection module 142;
 a translation module 144;
 a processor module 146; and
 an input/output (I/O) module 148.

In this embodiment 140, a flash memory device 150 can be included, with a storage capacity of 1 to 4 megabytes (or more) for the purpose of running applications. The memory management for the device may be handled by a crypto controller operating system with an 8 bit address bus in the dual interface (DI) chip. The flash memory device may be any suitable device including, but not limited to, Secure Digital (SD) card format, and including SIM card. (A crypto controller is a processor chip capable of encrypting and decrypting data to be stored in internal or external memory.)

The functionality of the invention has been described hereinabove. Various applications for the invention will be described hereinbelow. Meanwhile, exemplary physical forms of the invention will be described.

Figure 2A:
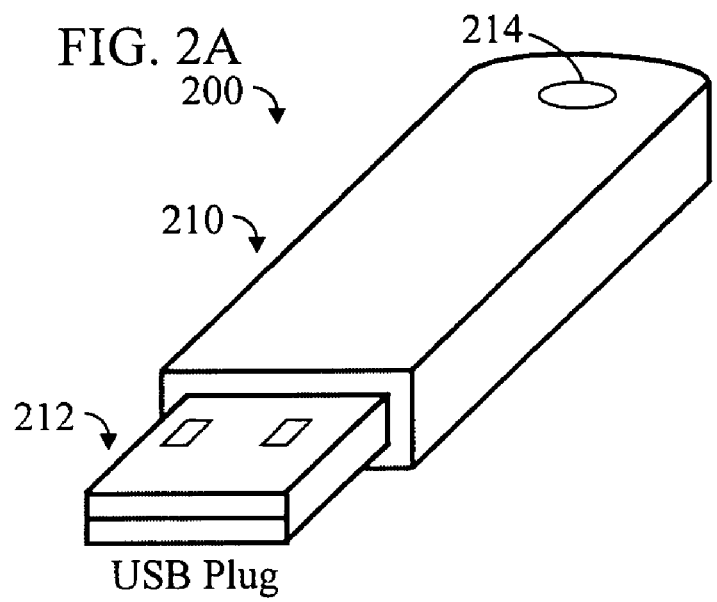
FIG. 2A is a perspective view of an embodiment of the invention.

The invention may be embodied in the form of a "smart fob" apparatus, having the general physical configuration (size, shape, form) of a conventional USB memory fob. Refer to FIG. 2A. This is basically a device 200 having the elongate size and general shape of your finger, comprising a main body portion 210 housing the electronics (cf. 104,106, 108) and a USB plug 212 (cf. 102) extending from an end of the body portion 210. A hole 214 may be provided for suspending the device 200 from a keychain (not shown).

As mentioned above, the "compact personal token apparatus" may be referred to herein as "smart fob" (without prejudice to any trademark rights which may be claimed). Now that its functionality has been described ("smart") and an exemplary physical form ("fob") has been described, the device will typically be referred to simply as the smart fob (without quotation marks).

Figure 2B:
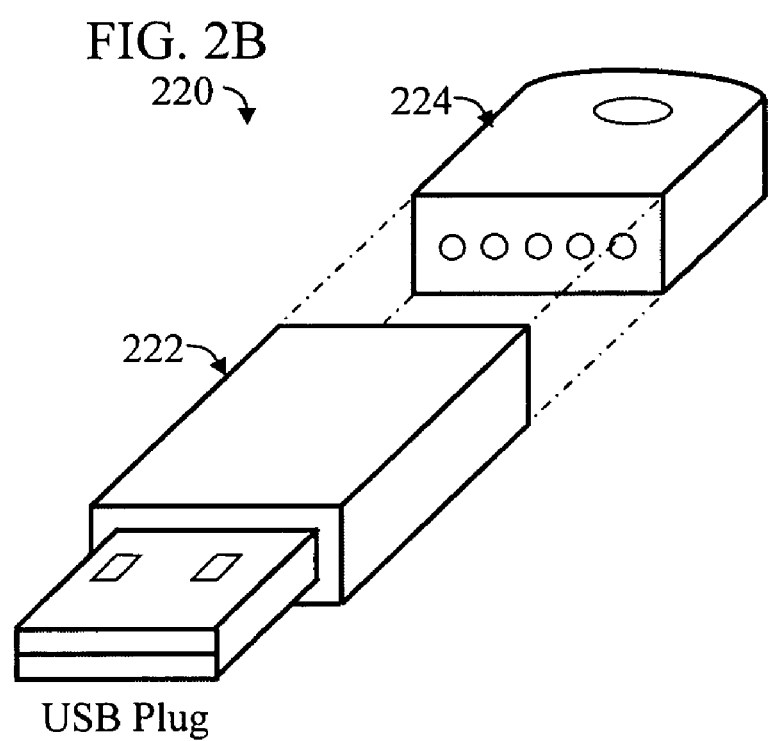
FIG. 2B is a perspective view of an embodiment of the invention.

FIG. 2B illustrates another exemplary embodiment 220 of the smart fob, again in the general form of a USB memory fob. But in this case, the smart fob has a first physical module 222 (left, as viewed) which contains the connection module (e.g., 102, USB plug, cf. 212) and translation module (e.g., 104), and a second physical module 224 (right, as viewed) which contains the processor module (e.g., 106, dual-interface chip) and output module (e.g., 108, RF antenna and modulator). The two modules 222 and 224 can plug together and be taken apart from one another. In this manner, after interacting with the "virtual world" on his computer, the user can separate the two modules 222 and 224 and carry just the second module, for conducting "real world" transactions. The second module 224, comprising processor and output module, is sufficient for conducting real world, contactless transactions, in the manner of a smart card. In other words, the smart fob can emulate a smart card.

Figure 3A:
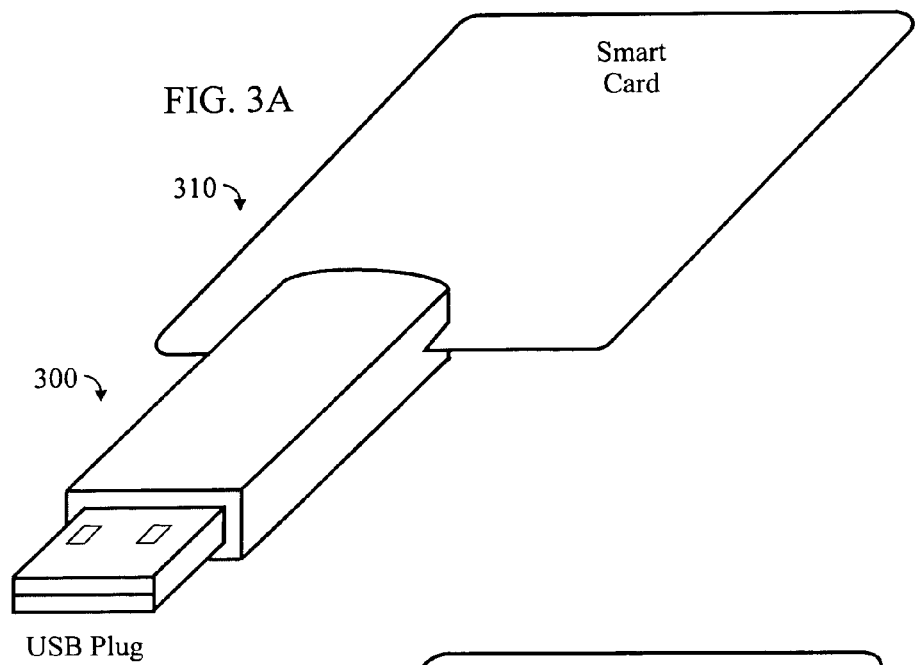
FIG. 3A is a perspective view of an embodiment of the invention.

FIG. 3A illustrates another exemplary embodiment of the invention wherein, rather than being intended to function as (emulate) a smart card, the output module (e.g., 108) of the compact personal token apparatus 300 is adapted to receive and communicate with a standard (including dual interface) ISO 7810 (7816) smart card 310. Instead of an RF antenna (and modulator), the fob 300 would have contacts for interfacing with the contact pads of the smart card 310.

Figure 3B:
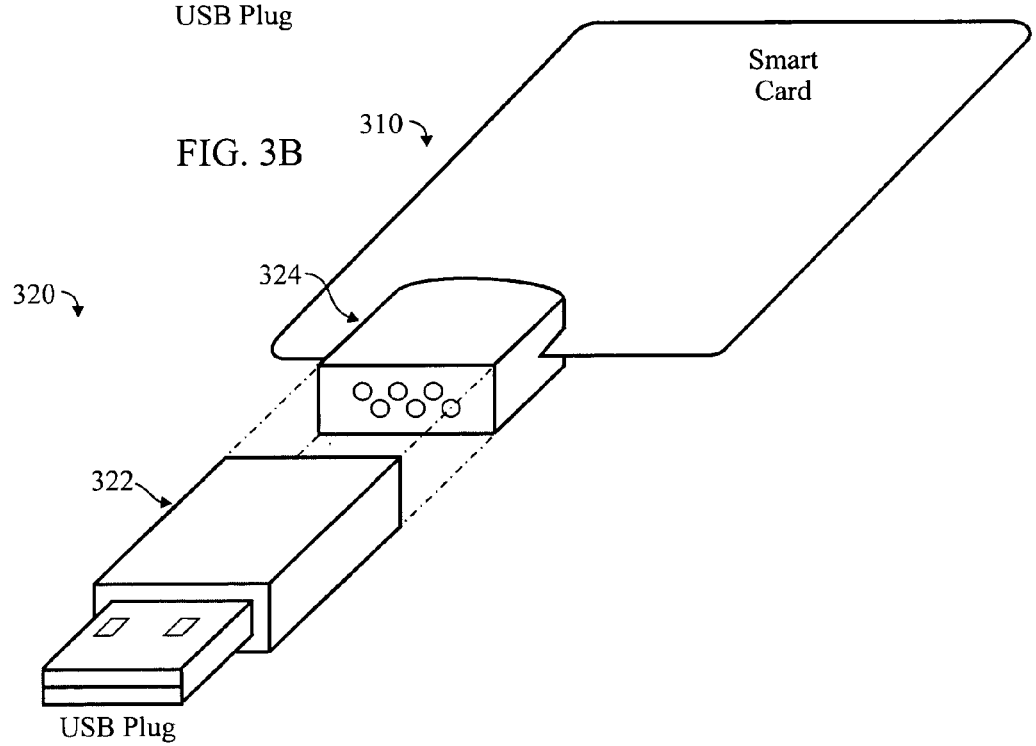
FIG. 3B is a perspective view of an embodiment of the invention.

The fob of this embodiment could be modularized, as shown in FIG. 3B, having a first physical module 322 comprising the input module (e.g., 102) and translation module (e.g., 104) and a second physical module 324 comprising the processor module (e.g., 106) and the output module (having contacts rather than antenna/modulator), although the purpose of modularization in this case would not be for carrying around, but rather for changing/updating components. Or, the FIG. 2A or 2B embodiments could be modified by just adding a contact reader slot for a smart card. In this case, the compact personal token apparatus functions as more than a reader, it is a transaction device.

Normally, the FIG. 3A/3B product would not require the DI chip (e.g., 106) and the RF interface (e.g., 108). However, if it does, when connected to a PC it could be used to load value stored on a smart card onto the smart fob, and then use that value in the real world. Now you have the ability to add value and information or exchange value and information between the fob and a conventional contact smart card.

Also if the FIG. 3A/3B product would contain the chip and the RF interface you could use it—when connected to a PC—to load value stored on a smart card and then use that value in the real world. This provides the ability to add value and information to the smart fob from smart cards as well as from the Internet. An example would be a cash transaction between two people—a person with a smart card could transfer the purchase amount of an item to the smart fob via the 7816 interface and the owner of the smart fob could take the smart fob to a fast food restaurant and use the stored value to buy lunch. In these cases, the FIG. 3A/3B embodiment is not simply a smart card reader.

In a variation on the above, combining (so to speak) FIGS. 2B and 3B, a modular smart fob could be sold having the left hand portion 222 (or 322) of the two devices 220, 320, plus the right hand portion 224, plus the right hand portion 324 so that the device could function both as a smart card (with RF interface) and as a smart card reader (with contacts for reading/writing smart cards), in addition to its functionality derived from plugging into a PC and interacting with the virtual world via the Internet.

Figure 4:
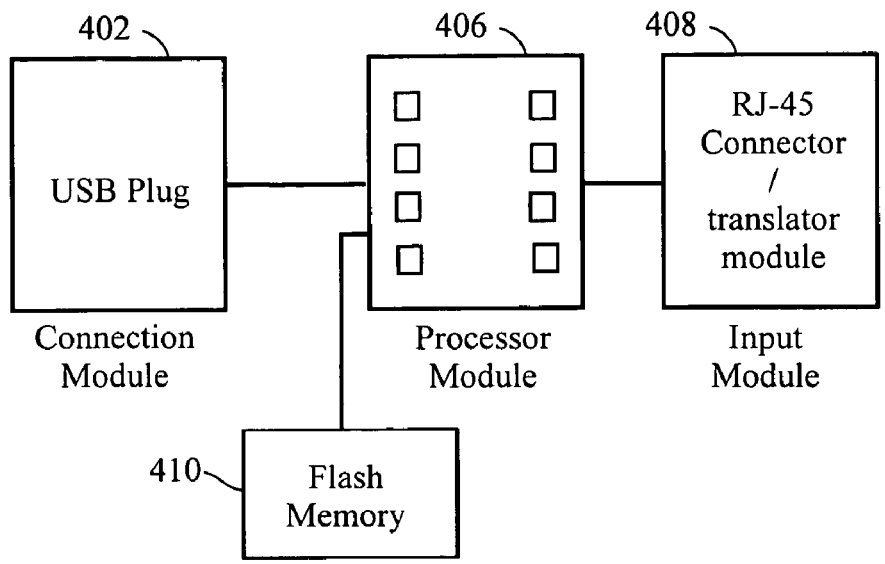
FIG. 4 is a schematic block diagram of an embodiment of the invention.

FIG. 4 is a schematic block diagram of an exemplary embodiment 400 of the invention wherein the device can be used as a firewall to protect, for example, a PC. The functionality is described elsewhere in greater detail. The principal components of the device 400 are:
 a connection module 402 for plugging into the USB (or, network, LAN/Ethernet, or Fast Ethernet 10/100 MBit) port of a PC;
 a processor module 406; and an input module 408 which, unlike other embodiments, need not perform wireless or contactless functions, but rather is a socket (or plug), such as RJ-45, for connecting to a telephone line (or the like) supporting a DSL (or the like) connection to the Internet.

The device 400 may also incorporate flash memory 510 (compare 150).

Figure 5:
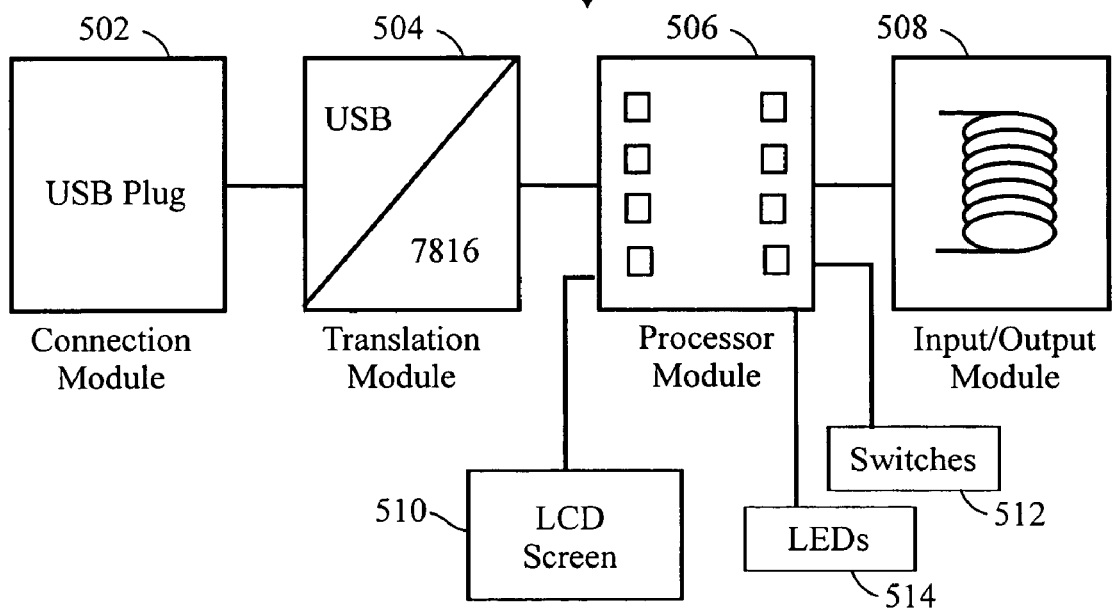
FIG. 5 is a schematic block diagram of an embodiment of the invention.

FIG. 5 is a schematic block diagram of an exemplary embodiment 500 of the invention, based on the embodiment 100 of FIG. 1. The major components are:

a connection module 502;

a translation module 504;

a processor module 506;

an input/output (I/O) module 508; and an LCD display 510 for displaying messages regarding status or other relevant information to the user. It will be understood that a device having an LCD display should be "active", having its own battery (not shown).

Other input and output devices, such as switches 512 and LEDs (light-emitting diodes) 514, could readily be added to the device.

The smart fob of the present invention can be implemented in forms other than that of resembling a conventional USB key fob, including single chip solutions, multichip modules, a form resembling that of a flash memory device such as an SD card, and the like. The form that the invention takes is largely dictated by the apparatus with which it is intended to interface. For a PC, a USB fob is ideal. For an Internet capable mobile phone, a SIM card or SD card format may be preferable.

Applications/Use

In use, for example, the user plugs the smart fob into his PC, or other Internet capable device (appliance), connects to the Internet, and interacts with a service or content provider to upload and/or download information. For example, downloading a ticket. Then, the user takes the smart fob to the event where it connects wirelessly or contactlessly with a reader at the venue to allow entrance and stamp the ticket (e.g., set a flag indicating that the ticket was used).

In another example, a consumer can use the smart fob to store "e-coupons" on the smart fob—loaded via the Internet. Then taking the smart fob to a participating merchant, use the coupons to receive a savings or price reduction on the product.

In another example, a consumer could load cash value to the smart fob via the Internet and use the cash in the real world—at participating merchants—to buy a meal, newspaper, etc.

In another example, which can be called "kids fob" (also, without prejudice to potential trademark rights)—parents can provide their young children with a smart fob loaded with a preset amount of cash and send them off to the mall or participating theatre and know that the money will be used as intended.

In another example, a consumer could use the smart fob to load cash via the internet—and while still connected to the PC use the stored value to pay cash for products or services on the internet. This addresses the concern that consumers still have some reservations about giving out their credit card information over the Internet.

In another example, a consumer could load award certificates onto the smart fob earned from a merchant loyalty program and then take the smart fob to a retail store to redeem for merchandise—no more waiting for mailed certificates.

In another example, the smart fob could store a biometric—such as fingerprint, iris scan etc., in a memory cell that is locked and when using the smart fob to gain access to a controlled area, the user touches his finger to a reader, waves the smart fob in front of a reader, the finger print is compared to the stored info, the user's identity is verified, and he is granted access.

Another exemplary application for the smart fob would be Electronic Learning. Typically, a student has to download a lot of information from the University in the course of any course of study, needs passwords to enter external databases, and needs a swipe card to use a photocopier or even pay at the school cafeteria. Also, access to the library is restrictive. In short, the smart fob of the present invention could be used to store files, access networks, download secure sealed PDF files, access buildings and make payment for services. Upon admission, all of the information could be ported to the student's smart fob.

In general, applications for the smart fob comprise substituting smart cards with the smart fob in a multiple of applications such as automatic fare collection in mass transit, paperless event & travel ticketing, loyalty programs, coupon redemption, cashless payment and online services.

The smart fob can operate as a security device. For example, the smart fob starts an auto-run application, after insertion in an Internet-connected PC. In simple terms, the PC user is automatically connected to a participating merchant's website and can conduct a business transaction in a secure fashion, without the fear of anyone spying or manipulating the data. This requires the the creation of a virtual private network (VPN) tunnel from the user's PC over the public infrastructure to the ISP (Internet Service Provider) or Trusted Secure server via a firewall, and after user authentication, providing the direct link to the host server. The VPN software is embedded into the smart fob and loaded onto the firewall appliance to create the gateway and to protect the ISP or Trusted Secure server. In essence, the smart fob provides the firewall protection for the home PC user, whereby the screening software resides in the firewall appliance. The embedded software in the device is field upgradeable, meaning that the cryptographic and application software can be updated online anytime.

Multi-applications are feasible with a single smart fob device, but it also envisaged that a PC user could have a specific "smart fobs" from each of his or her preferred travel agent, airline, hotel chain, car rental, financial institute, media concern, book & music store, entertainment provider, retailer, lottery operator, etc.

The smart fob device provides convenience, flexibility and enhanced transaction speed. It performs all of the same functions as a traditional smart card, but it is a "readerless" solution in the home environment (eliminating the primary barrier to smart card adoption by consumers). Simple and effective—all the user needs to do is plug the device into the USB port in the home PC and download eCash, tickets or coupons.

In use, for example, the user plugs the smart fob device into a PC, connects to the Internet, and interacts with a service or content provider to upload and/or download information. For example, the user can download an event ticket, take the device to the venue, just wave the device in close proximity to a turnstile equipped with a contactless reader at the entrance, and access is granted without having to stand in line.

In another example, a consumer can load cash to the electronic purse of the smart fob device via Internet banking, and while still connected to the PC use the stored value to pay for online products or services.

Equally, a consumer can load electronic cash to the smart fob device and use the e-cash at participating merchants to pay for food and beverages. No hassle with cash, tickets or queues!

In another example, a consumer can visit a participating merchant's website and download "e-coupons" to the smart fob device. At the retail (e.g., grocery) store, the consumer can redeem the coupons for savings on their purchases. At the checkout the consumer purchases are scanned and checked against the database of stored e-coupons in the smart fob device. The value of the coupons is decremented off the device and the savings amount is passed to the cash register to deduct from the total bill.

In another example, a consumer can load award certificates onto the device earned from a merchant loyalty program and then redeem them for merchandise at the store.

As mentioned above, the smart fob (device) is capable of implementing an auto-run application, when inserted into a personal computer (PC) connected to the Internet, and information exchanged and stored can be accessed in the real world application via its wireless and/or contactless interface.

In the auto-run application, the smart fob can function as a portable client user that can be inserted into any Internet connected PC having Windows 2000, Windows XP or Linux operating system with activated firewall. Information is exchanged over the Internet via the TCP/IP (Transmission Control Protocol/Internet Protocol) protocol and protected, for example by SSH (Secure Shell) encryption for remote login. A VPN (Virtual Private Network) cryptographic tunnel for secure information communication over the public infrastructure to the ISP (Internet Service Provider), the Trusted Secure server or directly to the Host server is initiated when the smart fob is inserted into the PC. The process "point-to-point tunnelling" means that packets of data are encrypted and wrapped inside IP (Internet Protocol) packets so that non-IP data can travel through the Internet. The Secure Shell solves the security problem of hackers stealing passwords and attacks such as IP spoofing, IP source routing and DNS spoofing.

The VPN software is loaded onto the smart fob and onto the firewall appliance to create the gateway and to protect the ISP or Trusted Secure server.

The secure tunnel for secure information communication over the public Internet to the ISP (Internet Service Provider) is initiated when the smart fob is inserted into the PC, a feature provided by the auto-run functionality. The embedded static IP address locates the ISP or Trusted Secure server.

The selection of IPsec (short for IP Security), which operates at layer 3 of the OSI model, makes it suitable for protecting non-IP packets, for example UDP traffic as compared with transport-layer protocols such as SSL, which cannot protect UDP level traffic.

The client user can be authenticated by the ISP or by a trusted third party through a digital signature or a unique MAC (Media Access Control) address, or through the implementation of public key infrastructure in order to validate the client's identity.

By passing through an ISP or in-house secure server with virus scan and filter, Spam, Trojan Horses, Worms or Pop-Up Windows can be blocked. After authentication is successfully verified, a direct link with the host server is established.

Therefore, the smart fob can be viewed as a marketing platform that encapsulates auto-run application software for a specific application, a USB apparatus for memory management and radio frequency identification, mass storage capability, a secure server for authentication and filtering as well as a wireless and/or contactless interface, to provide a myriad of solutions addressing marketing, e-commerce, business productivity, IT (information technology), consumer, communication, content, security and mobility issues.

The smart fob can be used as a payment device for retail purchase & loyalty with the Internet feature allowing users to download value, coupons, tickets, entertainment content, etc. The smart fob can be personalised like a conventional credit/debit card for electronic payment and the wireless and/or contactless interface feature can be used for photo identification, to download transit & event tickets, to receive complimentary coupons, loyalty points, gift certificates and messages, for vending and to redeem coupons. In addition the smart fob eliminates the need to tender with cash.

For example, by simply inserting the smart fob into the USB port of a telephone linked PC, an automatic Internet connection to the website of the user's favourite airline is established, via a secure server to authenticate the user and block spam, viruses, and SMTP (simple mail transfer protocol) based attacks. Personal data, frequent flyer miles as well as credit card details can be encrypted and stored in the smart fob. Tickets can also be downloaded onto the smart fob and used in contactless mode at the airline check-in desk. This "client user to secure server to host server" concept blocks pop-up windows, viruses, worms, spam and Internet "phishing" fraud. The airline can use the platform to attract other merchants that compliment the airline's product portfolio.

For a smart fob with on-board battery power and a display (e.g., a small one or two line LCD display panel), the seat reservation number can be stored on the display.

A consumer can load funds from their bank account via the Internet to the ISP or trusted server using the smart fob as an authentication tool, and while still connected to the PC use the stored value to pay for online products or services. This is particularly interesting for those that are uncomfortable using their credit card for online payments.

Parents can provide their teenagers with a smart fob loaded with a preset amount of cash and send them off to the mall or participating theatre and know that the money will be used as intended.

Teenagers are also among the most likely groups to pay on the Internet, however their inability to obtain credit cards and low online debit acceptance has historically made online payment difficult. This implies that a market for an alternative payment system targeted at teens exists and that web merchants must integrate new solutions if they want to target the teen market. Although teens can make purchases indirectly using a parent's credit cards, the buying experience is not the same due to the loss of independence for the teenager.

A prepaid or stored value apparatus such as the smart fob allows teens to shop on the Internet securely and without getting into debt. Although individually teenagers have limited income, together their income amounts to significant spending power. Therefore, there is a need in the market for a teen payment product that allows secure payments online.

Using an online shopping basket template, consumers can order groceries from the comfort of their home and collect them "ready to go" at the retail participating outlet, using their smart fob. Consumers enjoy increased convenience, faster shopping and quick checkout times. Retailers can quickly and easily take advantage of the order online & payment technology to speed transaction processing, increase revenue, and better understand customer buying behaviour.

Similar to the convenience store application, consumers can order rental movies online and collect them ready to go, using their smart fob. As transponders are used for inventory and anti-theft purposes in DVDs (digital versatile discs) and video tapes, the same data can be stored in the smart fob, allowing the consumer to just collect the rentals and leave without having to wait in a queue at the checkout.

Another application is using the smart fob for network access (logical access), remote mail and PC access. And to implement solutions to help organisations, establish more efficient business processes, address security concerns and gain a competitive advantage.

Users can connect to the corporate network or home PC from almost anywhere using one smart fob for roaming and another (stationary) for insertion in the desktop at work or home office computer. The smart fob inserted into the stationary PC is simultaneously connected directly to the DSL line or via an plug-in adapter. When the PC is switched off, the stationary smart fob draws it's energy from the telephone line, or from external power. When the roaming smart fob is plugged into an external Internet connected PC, the MAC (media access control) address of the stationary apparatus is called upon via the exchange secure server. This stationary smart fob switches on the PC and computing activity can begin. The stationary smart fob functions as a server and acts as a firewall with anti-virus software to protect the PC. The stationary smart fob, i.e. server, can have either a MAC address or a Uniform Resource Locator (URL) address.

Therefore, corporate computing resources can be reached from a home PC, an airport business centre, cyber-café or a kiosk computer allowing easy access to email, enterprise applications and data.

The smart fob can be used to reduce parent's anxiety by denying their children access to unsuitable websites, while permitting the children and teenagers access to the enjoyment and education value the Internet has to offer. The smart fob can be used to record and restrict all inbound and outbound Internet activity. By inserting the smart fob into the USB port of the home-PC, it enables the broadband, ISDN or analogue telephone connection, thus allowing access to the Internet. By mechanically disengaging the apparatus, the telephone line is disconnected, preventing access to the Internet. When children are allowed to surf on the Internet, data names concerning Internet sites or words put through search engines are compared with a library held in the memory of the smart fob. Therefore, children are independent and flexible to access the Internet without parental password control. Software updates can be automatic.

If a PC with DSL connection is left switched on, hackers or cyber-terrorists can potentially enter the PC as the broadband connection is constantly enabled. They are a real threat to the Internet and business information community. The smart fob can be used to disconnect the DSL line, by simply removing the device from the USB port. This prevents interference as well as preventing anyone from surfing the Internet from the user's PC. The physical DSL wire connection to the PC can remain, but access to the world wide web is only feasible when the USB apparatus is plugged back into one of the USB ports on the PC. Alternatively the USB apparatus can stay plugged in, but can be disengaged via a software code.

The smart fob can allow access to the worldwide web as a "free-Internet" service, making the ISP redundant. Also single applications can be stored on the secure server for selection by the client user.

In distress situations the user can use the smart fob to call for help, from the PC, from an icon (button) on the PC. Patient medical records can also be stored in the device.

When a user enters a hot zone area equipped with a Wi-Fi/802.11 wireless local area network, such as a shopping mall, airport or cinemaplex, information, news or special offers can be sent to the smart fob. The consumer is alerted by visual and/or audible means that information relevant to his/her preferences (based on pre-registered data) have been received by the smart fob. Discounts can be sent in barcode format and redeemed at the participating merchant, by just displaying the barcode on the LCD (liquid crystal display) screen of the smart fob to a scanner at the checkout.

As the smart fob can receive messages in hot zone areas, it can be used to send a text message. (This, of course, would require at least a simple technique for entering text or sending stored, "standard" text messages.)

The smart fob can act as a content filter or for intrusion detection & prevention.

Music can be downloaded from the Internet using the smart fob as a storage device and for making electronic payment to a virtual music store. In the real world, the contactless function can be used to identify the consumer when he or she enters the high street store and to target the consumer with music of his or her preference at the listing booths.

Members can use the smart fob to communicate via the ISP or Trusted server with a club and to conduct transactions.

Law enforcement agencies cannot prevent the existence of adult content, but the concern is the exposure of children to such material on the Internet. The smart fob can be used to unscramble encoded content, operating in a similar fashion to a smart card in a television decoder box for cable TV viewing.

These are but a few of the potential uses for the smart fob of the present invention. One having ordinary skill in the art to which the present invention most nearly pertains will readily be able to implement these applications, based on the descriptions set forth herein.

Recap/Synopsis

Various features of the smart fob (e.g., compact personal token device) of the present invention are summarized and/or presented in the following numbered paragraphs.

¶1. A compact personal token apparatus, comprises:
a standard-compliant contact based interface; this interface complying to one or more of the following standard interfaces: USB (universal serial bus), IEEE1394 (Fire Wire), PCMCIA, Compact Flash, Multi Media, Memory Stick, Smart Media, Secure Digital (SD), mini SD, IBM Micro Drive, or any similar standard interface. These interfaces are all well known. ("Smart Media" refers to the Smart Media card, and "Secure Digital" refers to a Secure Digital (SD) card.)

This is a good place to mention the following. When a given standard or interface is specifically mentioned, it is typically intended to be an example of any other standard or interface that can perform substantially the same function as the standard(s) or interface(s) that are specifically mentioned. Many of these "other" standards and interfaces can be found in the GLOSSARY section hereinabove and/or are known in the industry and/or will evolve or be newly developed in the near future. The present invention should be interpreted to include all similar standards and interfaces, as appropriate to the context of the specific embodiments being discussed.

¶2. The compact personal token apparatus set forth in paragraph ¶1 further comprises:

a standard-compliant contactless/wireless interface; this interface complying to one or more of the following standard interfaces: RFID-contactless interface according to ISO 14443 and ISO 15693 as well as similar interfaces; Bluetooth compatible interface, WLAN 812.11, UWB, or any similar interface.

¶3. The compact personal token apparatus set forth in paragraph ¶1 further comprises:

a standard-compliant interface, releaseably coupleable to a host processing device, this being under the command of an operating system; an interface module providing the translation of standard-compliant contact based interface messages to ISO 7816 compliant messages; the same interface module providing the translation of ISO 7816 compliant messages to standard-compliant contact based interface messages; a dual interface processor having an ISO 7816 compliant interface communicating through the interface module with the host processing device; the same dual interface processor communicating through its RFID-contactless interface like ISO 14443 and/or ISO 15693 or similar; the dual interface processor connected to an inductive antenna either being part of the PCB itself or en extra component inside the token.

¶4. The compact personal token apparatus set forth in paragraphs ¶1 or ¶2, further comprises:

a standard-compliant interface, releaseably coupleable to a host processing device, this being under the command of an operating system; an interface module providing the translation of standard-compliant contact based interface messages via a memory chip to Bluetooth/WLAN 812.11 device compatible compliant messages; the same interface module providing the translation of Bluetooth/WLAN 812.11 device compliant messages via a memory chip to standard-compliant contact based interface messages; a Bluetooth/WLAN 812.11 device having a Bluetooth/WLAN 812.11 compliant interface communicating through the interface module with the host processing device via a memory chip; the same Bluetooth/WLAN 812.11 device communicating through its Bluetooth/WLAN 812.11 compatible interface.

¶5. The compact personal token apparatus of paragraph ¶3, wherein:

the dual interface chip (processor) inside the personal token can be directly programmed by a software running on the host system using the interface processor without the need for an external contact based dual interface read/write device.

¶6. The apparatus of paragraph ¶5, wherein:

the software is web based, allowing for downloading information from the web directly into the dual interface processor memory (for example, event tickets) thus linking the virtual world to the real world.

¶7. The apparatus of paragraphs ¶5 or ¶6, wherein:

the downloaded information can be used in the real world by using the contactless RFID interface (e.g. public transport, e-payment and the like)

¶8. The apparatus of paragraphs ¶5 or ¶6, wherein:

the information stored in the personal token via the standard contact based interface is used for personal identification, secure network logon, access control, e-ticketing, e-payment and similar applications using either the standard compliant interface or the RFID-compliant interface.

¶9. The apparatus of paragraphs ¶5 or ¶6, wherein:

information received through the RFID-interface can be stored in the memory of the personal token and can then be provided to the host system via the standard interface, thus allowing a complete information exchange between the virtual world and the real world ¶10. The apparatus of paragraphs ¶3 or ¶4, wherein:

the contactless/wireless module is releaseably coupleable from the Interface module, thus providing a keyfob shape, easier to carry along.

¶11. The apparatus of paragraph ¶3, wherein:

the dual interface processor is mounted in a dual interface card complying to ISO 7810 and connected norms; the personal token providing physical contacts for the dual interface card; thus connected, the dual interface card can communicate with the host system through the interface module inside the personal token. Once the communication is done, the card can be released from the personal token and can be used then in the real world, just like described in paragraphs ¶5 to ¶9.

¶12. The compact personal token apparatus of paragraphs ¶1, ¶2 or ¶5, further comprises:

a flash memory or EEPROM device powered and addressed by the dual interface controller chip. The additional memory can be used for user authentication (storing digital signatures, certificates, key sets, finger-based biometric templates, usernames and passwords) and to run applications.

¶13. The compact personal token apparatus set forth in ¶1 further comprises:

a standard-compliant smart card contact interface complying to one or more of the following standard interfaces: ISO 7816, or any similar interface.

¶14. The compact personal token apparatus set forth in ¶2 further comprises:

a standard-compliant smart card contact interface complying to one or more of the following standard interfaces: ISO 7816, or any similar interface.

¶15. The compact personal token apparatus set forth in ¶1 further comprises:

a connection module, connecting the personal token apparatus to a host device such as PC, PDA, smart cellular phone or similar device, either directly or with the help of a standard reader device such as a memory card reader.

¶16. The compact personal token apparatus set forth in ¶1 further comprises:

a translation module, translating messages incoming from the contact based interface of claim 1, and translating messages to the host device from the personal token apparatus.

¶17. The compact personal token apparatus set forth in ¶1 further comprises:

a processor module, preparing messages to be sent by the contactless/wireless interface of ¶2, and interpreting messages received via the interface of ¶2.

¶18. The compact personal token apparatus set forth in ¶1 further comprises:
a triple interface (e.g., contact, contactless, USB) processor.

Additional Embodiments

The device (smart fob, USB key fob) can incorporate a SIM card or a SAM card.

It is not necessary that the device (smart fob, USB key fob) be equipped with all of the options for every application.

LEDs can be incorporated into the device (smart fob, USB key fob) to alert a user that certain functions are occurring.

The device (smart fob, USB key fob) can function as a mass memory device.

The device (smart fob, USB key fob) can function as a dongle for software license authentication.

The device (smart fob, USB key fob) can function as a token for providing network security. This embodiment could include a SIM card.

The device (smart fob, USB key fob) can function as a Smart Card for online-banking. This embodiment could include a SIM card.

The device (smart fob, USB key fob) can function as a Multi-Interface Reader-less Device to provide for physical and logical access control. This embodiment would include an RFID or NFC (Near Field Communication) antenna.

The device (smart fob, USB key fob) can function as a firewall to provide anti-virus protection. This embodiment would have a DSL plug-in socket and input-socket for external power.

In addition to the various formats of USB key fobs, it is contemplated to provide a docking station or hub that will accommodate at least two devices.

The flash memory could be integrated into the dual interface (DI) chip itself.

Additional Comments

Most memory based RFID chips or transponders have a unique modulation and communication protocol which influences the functionality and the type of antenna required for optimal operation. Because of the limitation on the size of the on-board EEPROM for such devices, the command set for Mifare, ISO 14443 A & B, ISO 15693, ISO 18000 or ISO 7816 resides on the ROM as well as being masked to the specific silicon device. The emergence of dual & triple interface micro-controllers opens up the possibility to integrate several communication protocols and modulation types onto a single device, by availing of the extensive memory capability of flash drive technology.

The advantage of loading the communication protocol and modulation type in software form to the flash memory eliminates the need to have several different type of chips with different antenna constructions for specific applications. True interoperability is achieved through software, resulting in higher volumes and yield for one particular controller.

Firewall Protection

Anti-Virus, -Worm, -Spam (and so forth) software normally resides on the home PC, slowing down it's functionality.

The device (smart fob, USB key fob) can comprise a 32 bit processor and 8 to 16 GB (GigaByte) memory capacity, and could be used as a server to protect the home PC from external intrusion. The device (smart fob, USB key fob) could have an IP (Internet Protocol) address, a socket for the broadband connection and a connection for external power. This USB server could be used to switch on the home PC from a remote location (using a MAC or IP address) in order to access files or to act as a protection guard from a constantly enabled DSL telephone line.

Downloading, Storing and Using Electronic Coupons ("E-Coupons").

The invention is a software application that uses the compact personal token apparatus referred to hereinabove as smart fob (again, this term is being used without prejudice to any trademark rights which may be claimed). The apparatus may also be referred to simply as "fob", or "personal device".

The basic concept allows registered consumers to visit a web site offering e-coupons ("coupon website") and (1) down-load "e-coupons" to the fob at home or office, then (2) take the fob with them to the retailer—grocery store or other participating merchant—and redeem the coupons for savings on their purchase.

In actual operation the consumer would, for example, log on to a participating manufacturer's web site (e.g., www-.manufacturer's name.com) and be redirected to the coupon website (e.g., www. e-coupon website. com) when the consumer selects the "Download Coupon" function at the participating manufacturer's web site. This would be transparent to the consumer—the consumer would not realize they have left the merchant site.

This provides the ability for the consumer to:

1) load at home and store electronically, on a personal device—for example the smart fob or even a contactless or dual interface smart card (collectively, these various devices are simply referred to as the "fob")—a large number of coupons and then take that device into the real world with him.

2) at the checkout (e.g., merchant, retailer, grocery) the consumer purchases would be scanned into the register normally, the consumer would present his fob to the point of sale (POS) contactless reader terminal—software in the POS device ("merchant software") would compare the purchased items against the database of stored e-coupons on the fob or other smart object (i.e., contactless smart card) and decrement the value of the coupons off the fob and pass that savings amount to the register to deduct that savings amount from the total register receipt. The e-coupons registration info would also be passed on to the merchant POS system so that the merchant can bill the manufacturer for the coupon value he paid out. Redeemed coupon info remains stored on the fob—in background in a memory area not accessible or visible to the consumer, for later use. (see note 7a below)

3) In addition to value, the fob would also store the expiration date of each coupon. The consumer could elect to be notified of expiring coupons—all expiring, or only those meeting a preselected value (set "filters"). Expired coupons would be removed from the fob the next time the consumer logs onto the home computer. (Unused coupon information would remain on the fob in the same secure inaccessible memory area—(see note 7b below)

4) The consumer side of the software ("home software") could also have a grocery list function, that could be printed out at home.

5) The home software would also allow the consumer to see the total value of coupons stored on the fob, total by product or category and a total of the redeemed coupons or actual savings.
6) The home software would allow the consumer to store a credit card and/or debit card on the fob to pay for the purchase if they choose not to pay with cash.
7a) The home software would also send purchase data—redeemed & expired coupon info back to the coupon website at the time the consumer does a new coupon download. This feature correlates specific coupon purchases with an identifiable consumer.
7b) The coupon website could also offer a fee based service to manufacturers or retailers to alert them (or even their competitor) that a predetermined time has passed since the consumer last used a coupon to purchase the specific item. (Unused coupon info may also be of some value to a manufacturer.) The merchant would then have the option of emailing the consumer another coupon for the product to stimulate a new buying decision, a competitor may want to send a coupon to the customer to attempt to change brand preference. These customer notification features could be permission-based allowing the consumer to opt-out.

The above is summarized in the following "flowchart".
user plugs fob (personal device) into computer
user logs onto to manufacturer website
   redirected to coupon website
user downloads e-coupons onto fob
home software checks for expired or expiring coupons
   user notified of expiring coupons
   expired coupons deleted from fob
   (optional) coupon website notifies manufacturer/retailer/competitor of expired coupons.
home software displays total value of stored coupons, savings, etc.
home software uploads purchase data to coupon website
(optional) home software has a grocery list function
(optional) home software can store user's credit card info on fob
user take fob to merchant, make purchase(s), redeem coupons
   merchant scans purchases
   merchant software compares coupons with purchases
   merchant software writes to fob, decrements coupons (or marks as used)
   (optional) merchant loads premiums onto user's fob
   merchant bills manufacturer
user returns home and plugs fob into computer for next session Some of the Advantages of the Invention Print at home coupons via the internet are available to consumers today. However, the consumer still has to remember to take them with him to the grocery, retail, fast food store. Merchants and manufacturers are experiencing fraud—counterfeit coupons or value changed. This has limited the growth of this type of couponing. The present invention would eliminate or substantially reduce the fraud aspect of at home couponing—all coupons are stored electronically in a secure memory cell.

Another problem solved by the invention is that sometimes cashiers just accept a plurality (hand full) of coupons from the shopper and deduct all the coupons—even if the item was not purchased. The present invention would eliminate this problem of redeemed coupons without product purchase.

The invention provides for effective management of manufacturers coupons—eliminate lost or forgotten coupons—maximize savings. Grocery or manufacturer can pass savings on to consumers.

Additional Embodiments

Rather than using the smart fob, or other fobs discussed hereinabove, the customer can plug a standard USB memory (stick) device into his home/office computer—download the home software, then down load coupons to the USB memory device and then at the participating grocery store or retail merchant plug the USB memory device into a POS device (cash register, kiosk etc) equipped with a USB receptacle connector to exchange stored coupons for savings. With the pure USB memory stick device there is no need to use the ISO 7816 smart card standard interface, or the ISO 14443 RFID protocol—just use standard USB communication protocol. (The smart fob embodiment of the invention communicates using ISO 7816 when the consumer has it plugged into his PC (USB to 7816 conversion) but at the grocery or retail outlet the communication is contactless using the ISO 14443 type A or B or Mifare standards.)

The merchant can upload data ("premiums") to the consumers fob (or USB memory device) at the POS (point of sale) terminal. This could be in the form of additional coupons for in store promotions, loyalty points or even music. Some of this digital content could be encrypted for limited time use or conditional access.

Optionally, all coupons are encrypted as a security feature reducing or eliminating the likelihood that coupon values could be counterfeited or altered in any way.

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

For example, a fob-style device designed for the PC environment, which plugs into the USB port of a computer, with an antenna coil in the device that enables the contactless part of a separate contactless smart card to communicate with contactless readers.

For example, a triple interface chip incorporating a range of highly secure smart card controllers—ISO 7816 contact interface, ISO 14443A contactless Interface and USB 1.1 (or 2.0) Interface. Additionally, incorporating a fourth interface for connecting directly to the Internet, such as via a DSL line.

For example, telephone handsets (also known as "cell phones" or "mobile phones") are providing slots for flash memory cards, such as SD (Secure Digital) and MMC (MultiMediaCard) cards, mainly for storing pictures. The present invention could be embodied in the form of a flash memory card such as a "smart" SD card" (comparable to the aforementioned "smart fob"), which could also include an antenna and tamper-resistant area which can be inserted into handsets for performing various of the e-commerce and other applications mentioned above.

For example, a smart SD card using a contact-based standard interface (e.g., SD card format) to load data to and from the card with the help of a card reader hooked to a PC or incorporated into a PDA, cell phone, etc, and which uses a contactless standard interface to use the stored data in the real world. Additional memory can be used to securely store customer information and data.

For example, with such a smart SD card, adding RFID to an apparatus (appliance) having an SD or miniSD memory card slot, such as a cell phone, PDA, laptop, digital camera, personal video player, MP3 player, etc.

For example, incorporating the latest technologies into the smart SD card (or with the smart fob described hereinabove), such as non-volatile FeRAM (ferroelectric RAM), which enables high-speed data writing, five times faster than conventional EEPROM-based smart cards. The large-capacity flash memory in the smart SD Card can be used as an extra storage area for the smart card module and the stored data is protected by cipher technology.

What is claimed is:

1. A compact personal token apparatus, comprising:
    a connection module;
    a translation module;
    a processor module;
    an input/output module; and
    a contactless interface;
    wherein:
    the connection module is for interfacing the personal token apparatus with an Internet-capable appliance; and
    the translation module moves signals between the connection module and the contactless interface;
    wherein:
    the contactless interface is an RFID interface;
    further comprising a wireless interface;
    wherein the translation module moves data or signals from a USB interface to the RFID interface and to the wireless interface with storage of data in a flash memory or EEPROM of the processor module (dual interface chip), and data can reside temporarily at one of the interfaces.

2. The compact personal token apparatus of claim 1, wherein:
    the Internet-capable appliance comprises a device selected from the group consisting of personal computer (PC), laptop, PDA, MP3 player cellphone, and similar Internet-capable devices; and
    the interface with the Internet-capable appliance is selected from the group consisting of USB, FireWire, IR, Bluetooth, standard serial port, and WLAN.

3. The compact personal token apparatus of claim 1, wherein:
    the interface with the Internet-capable appliance comprises a USB connection.

4. The compact personal token apparatus of claim 1, wherein:
    the contactless interface comprises a smart card interface.

5. The compact personal token apparatus of claim 4, wherein:
    the smart card interface is selected from the group consisting of ISO 14443, ISO 15693, and NFC.

6. The compact personal token apparatus of claim 1, wherein:
    the processor module comprises a dual interface (DI) chip.

7. The compact personal token apparatus of claim 1, wherein:
    the processor module incorporates the translation module.

8. The compact personal token apparatus of claim 1, wherein:
    the output module comprises an RF antenna and a modulator.

9. The compact personal token apparatus of claim 1, further comprising:
    flash memory.

10. The compact personal token apparatus of claim 1, wherein:
    the translation module is incorporated in the processor module so that the personal token apparatus can go directly from USB to contactless without being limited by smart card software architecture limitations.

11. The compact personal token apparatus of claim 1, wherein:
    the connection, translation, processor and input/output modules are embodied in a form of an apparatus having a general physical configuration of a conventional USB memory fob.

12. The compact personal token apparatus of claim 11, wherein the fob comprises;
    a first physical module containing the connection module and the translation module; and
    a second physical module containing the processor module and the output module.

13. The compact personal token apparatus of claim 1, wherein:
    the output module comprises contacts for interfacing with a smart card.

14. The compact personal token apparatus of claim 1, wherein:
    the fob is configured for interfacing with the Internet and emulating a smart card.

15. The compact personal token apparatus of claim 1, wherein:
    the connection module is for interfacing the personal token apparatus with an Internet-capable appliance; and
    the personal token apparatus incorporates firewall functionality to protect the Internet-capable appliance.

16. The compact personal token apparatus of claim 1, further comprising:
    interfaces for ISO contact, contactless, USB and DSL.

17. The compact personal token apparatus of claim 1, further comprising:
    an LCD screen.

18. The compact personal token apparatus of claim 1, further comprising:
    at least one switch.

19. The compact personal token apparatus of claim 1, further comprising:
    at least one LED.

20. The compact personal token apparatus of claim 1, further comprising:
    a standard-compliant contact based interface, the contact based interface complying to at least one standard interface selected from the group consisting of USB, IEEE 1394, PCMCIA, Compact Flash, Multi Media, Memory Stick, Smart Media, Secure Digital, mini SD, and IBM Micro Drive.

21. The compact personal token apparatus of claim 20, further comprising:
    a standard-compliant interface releaseably coupleable to a host processing device, this being under a command of an operating system;
    an interface module providing translation of standard-compliant contact based interface messages to ISO 7816 compliant messages and providing the translation of ISO 7816 compliant messages to standard-compliant contact based interface messages;

a dual interface processor having an ISO 7816 compliant interface communicating through the interface module with the host processing device, the dual interface processor communicating through the contactless interface and connected to an inductive antenna.

22. The compact personal token apparatus of claim 21, wherein:

the contactless interface is releaseably coupleable from the interface module.

23. The compact personal token apparatus of claim 21, wherein:

the dual interface processor is mounted in a dual interface card complying to ISO 7810 or a 7816 compliant SIM module and connected norms;

the compact personal token apparatus provides physical contacts for the dual interface card, or a 7816 compliant form factor; and when connected, the dual interface or SIM card can communicate with the host processing device through the interface module inside the personal token apparatus and, once the communication is done, the card can be released from the personal token apparatus and can be used then in the real world.

24. The compact personal token apparatus of claim 21, wherein:

the dual interface chip (processor) inside the personal token apparatus can be directly programmed by a software running on the host system using the interface processor without the need for an external contact based dual interface read/write device.

25. The compact personal token apparatus of claim 24, wherein:

the software is web based, allowing for downloading information from the web directly into the dual interface processor memory, thus linking the virtual world to the real world.

26. The compact personal token apparatus of claim 25, wherein:

the downloaded information can be used in the real world by using the contactless interface.

27. The compact personal token apparatus of claim 26, wherein:

the information stored in the personal token apparatus via the standard contact based interface is used for personal identification, secure network logon, access control, e-ticketing, or e-payment applications using either the standard compliant interface or the RFID-compliant interface.

28. The compact personal token apparatus of claim 26, wherein:

information received through the contactless interface can be stored in the memory of the personal token apparatus and can then be provided to the host processing device via the standard interface, thus allowing a complete information exchange between the virtual world and the real world.

29. The compact personal token apparatus of claim 24, wherein:

the information stored in the personal token apparatus via the standard contact based interface is used for personal identification, secure network logon, access control, e-ticketing, or e-payment applications using either the standard compliant interface or the RFID-compliant interface.

30. The compact personal token apparatus of claim 24, wherein:

information received through the contactless interface can be stored in the memory of the personal token apparatus and can then be provided to the host processing device via the standard interface, thus allowing a complete information exchange between the virtual world and the real world.

31. The compact personal token apparatus of claim 24, further comprising:

additional memory selected from the group consisting of flash memory and EEPROM device powered and addressed by the processor module;

wherein the additional memory can be used for user authentication and to run applications.

32. The compact personal token apparatus of claim 21, further comprising:

a standard-compliant interface releaseably coupleable to a host processing device, this being under a command of an operating system;

an interface module providing translation of standard-compliant contact based interface messages via a memory chip to Bluetooth/WLAN 802.11 device compatible compliant messages, and providing the translation of Bluetooth/WLAN 802.11 device compliant messages via a memory chip to standard-compliant contact based interface messages; and a Bluetooth/WLAN 802.11 device having a Bluetooth/WLAN 802.11 compliant interface communicating through the interface module with the host processing device via a memory chip; the same Bluetooth/WLAN 802.11 device communicating through its Bluetooth/WLAN 802.11 compatible interface.

33. The compact personal token apparatus of claim 20, further comprising:

a processor module; and additional memory selected from the group consisting of flash memory and EEPROM device powered and addressed by the processor module;

wherein the additional memory can be used for user authentication and to run applications.

34. The compact personal token apparatus of claim 20, further comprising:

a standard-compliant smart card contact interface complying to ISO 7816.

35. The compact personal token apparatus of claim 20, further comprising:

a connection module, connecting the personal token apparatus to a host device including PC, PDA, or smart cellular phone, either directly or with the help of a standard reader device such as a memory card reader.

36. The compact personal token apparatus of claim 20, further comprising:

a standard-compliant interface releaseably coupleable to a host processing device, this being under a command of an operating system; and a translation module, translating messages incoming from the contact based interface, and translating messages to the host device from the personal token apparatus.

37. The compact personal token apparatus of claim 20, further comprising:

a triple interface processor including contact, contactless, USB.

38. The compact personal token apparatus of claim 1, further comprising:
a standard-compliant wireless interface selected from the group consisting of Bluetooth compatible interface, WLAN 802.11, and UWB.

39. The compact personal token apparatus of claim 38, further comprising:
a standard-compliant interface releaseably coupleable to a host processing device, this being under a command of an operating system;
an interface module providing translation of standard-compliant contact based interface messages via a memory chip to Bluetooth/WLAN 802.11 device compatible compliant messages, and providing the translation of Bluetooth/WLAN 802.11 device compliant messages via a memory chip to standard-compliant contact based interface messages; and
a Bluetooth/WLAN 802.11 device having a Bluetooth/WLAN 802.11 compliant interface communicating through the interface module with the host processing device via a memory chip; the same Bluetooth/WLAN 802.11 device communicating through a Bluetooth/WLAN 802.11 compatible interface.

40. The compact personal token apparatus of claim 39, wherein:
the contactless/wireless interface is releaseably coupleable from the interface module.

41. The compact personal token apparatus of claim 38, further comprising:
a processor module; and
additional memory selected from the group consisting of flash memory and EEPROM device powered and addressed by the processor module;
wherein the additional memory can be used for user authentication and to run applications.

42. The compact personal token apparatus of claim 38, further comprising:
a standard-compliant smart card contact interface complying to ISO 7816.

43. The compact personal token apparatus of claim 38, further comprising:
the processor module prepares messages to be sent by the contactless and wireless interfaces, and interprets messages received via the contactless and wireless interfaces.

44. Method of interacting wirelessly, comprising:
providing a device;
interfacing the device with an Internet-capable appliance; and
providing a contactless interface in the device selected from the group consisting of ISO 14443 and ISO 15693;
wherein the contactless interface is an RFID interface;
further comprising providing a wireless interface;
wherein the translation module moves data or signals from a USB interface to the RFID interface and to the wireless interface with storage of data in a flash memory or EEPROM of the processor module (dual interface chip), and data can reside temporarily at one of the interfaces.

45. Method, according to claim 44, wherein:
the interface with the Internet-capable appliance is selected from the group consisting of USB, FireWire, IR, Bluetooth, standard serial port, WLAN.

46. Method, according to claim 44, wherein:
the Internet-capable appliance comprises a device selected from the group consisting of personal computer (PC), laptop, PDA, MP3 player and cell phone.

47. Method, according to claim 44, wherein:
the device is modular in construction.

48. Method, according to claim 44, wherein:
the device performs a firewall functionality to protect the Internet-capable appliance.

49. Method, according to claim 44, wherein:
the device incorporates interfaces for ISO contact, contactless, USB and DSL.

50. A compact personal token apparatus, comprising:
a connection module for interfacing the personal token apparatus with an Internet-capable appliance;
a contactless interface; and
a translation module for moving signals between the connection module and the contactless interface;
wherein the contactless interface is an RFID interface;
further comprising a wireless interface;
wherein the translation module moves data or signals from a USB interface to the RFID interface and to the wireless interface with storage of data in a flash memory or EEPROM of the processor module (dual interface chip), and data can reside temporarily at one of the interfaces.

51. The apparatus of claim 50 wherein the connection module is selected from the group consisting of USB, FireWire, IR, Bluetooth, standard serial port, and WLAN, interfaces capable of interfacing with the Internet-capable appliance.

52. The apparatus of claim 50 wherein the Internet-capable appliance is selected from the group consisting of personal computer (PC), laptop, PDA, MP3 player, and cellphone.

53. The apparatus of claim 50 wherein the contactless interface is selected from the group consisting of ISO 14443, ISO 15693, and NFC contactless interfaces.

54. The apparatus of claim 50, further comprising:
a wireless interface.

55. The apparatus of claim 50, further comprising:
an RFID or NFC antenna.

56. Method of linking the virtual world of the Internet with the real world of contactless transactions, comprising:
providing a compact personal token apparatus, comprising:
a connection module for interfacing the personal token apparatus with an Internet-capable appliance;
a contactless RFID interface; and
means for moving signals between the connection module and the contactless interface;
interacting in the virtual world when connected with the Internet-capable appliance; and
interacting in the real world after interacting in the virtual world;
further comprising providing a wireless interface;
wherein the translation module moves data or signals from a USB interface to the RFID interface and to the wireless interface with storage of data in a flash memory or EEPROM of the processor module (dual interface chip), and data can reside temporarily at one of the interfaces.

57. The method of claim 56, wherein interacting in the real world comprises an activity selected from the group consisting of personal identification, secure network logon, access control, e-ticketing and e-payment applications.

* * * * *